United States Patent
Fulp et al.

(10) Patent No.: US 8,042,167 B2
(45) Date of Patent: Oct. 18, 2011

(54) METHODS, SYSTEMS, AND COMPUTER PROGRAM PRODUCTS FOR NETWORK FIREWALL POLICY OPTIMIZATION

(75) Inventors: Errin W. Fulp, Winston-Salem, NC (US); Stephen J. Tarsa, Duxbury, MA (US)

(73) Assignee: Wake Forest University, Winston-Salem, NC (US)

( * ) Notice: Subject to any disclaimer, the term of this patent is extended or adjusted under 35 U.S.C. 154(b) by 914 days.

(21) Appl. No.: 11/390,976

(22) Filed: Mar. 28, 2006

(65) Prior Publication Data
US 2006/0248580 A1    Nov. 2, 2006

Related U.S. Application Data

(60) Provisional application No. 60/665,664, filed on Mar. 28, 2005.

(51) Int. Cl.
*H04L 29/00* (2006.01)
*H04L 29/06* (2006.01)
*G06F 9/00* (2006.01)
*G06F 15/16* (2006.01)

(52) U.S. Cl. ............ 726/11; 726/12; 726/13; 713/153; 713/154; 709/238; 709/242; 709/240; 709/244; 370/351; 370/352; 370/357; 370/358

(58) Field of Classification Search .................. None
See application file for complete search history.

(56) References Cited

U.S. PATENT DOCUMENTS

| | | | |
|---|---|---|---|
| 6,098,172 A | | 8/2000 | Coss et al. |
| 6,484,261 B1 * | | 11/2002 | Wiegel ............................ 726/11 |
| 6,662,235 B1 * | | 12/2003 | Callis et al. ................... 719/318 |
| 7,089,581 B1 * | | 8/2006 | Nagai et al. ........................ 726/1 |
| 7,107,613 B1 * | | 9/2006 | Chen et al. ....................... 726/14 |
| 7,227,842 B1 * | | 6/2007 | Ji et al. ........................... 370/235 |
| 7,237,267 B2 * | | 6/2007 | Rayes et al. ...................... 726/25 |
| 7,263,099 B1 | | 8/2007 | Woo et al. |
| 7,299,353 B2 * | | 11/2007 | Le Pennec et al. ............ 713/159 |
| 7,331,061 B1 * | | 2/2008 | Ramsey et al. .................. 726/23 |
| 7,954,143 B2 * | | 5/2011 | Aaron .............................. 726/11 |
| 2002/0038339 A1 | | 3/2002 | Xu |
| 2002/0165949 A1 * | | 11/2002 | Na et al. ......................... 709/223 |
| 2002/0198981 A1 | | 12/2002 | Corl, Jr. et al. |

(Continued)

FOREIGN PATENT DOCUMENTS

EP    1 006 701 A2    6/2000

(Continued)

OTHER PUBLICATIONS

Notification of Transmittal of the International Search Report and the Written Opinion of the International Searching Authority, or the Declaration for International Application No. PCT/US06/11291 (Jul. 3, 2008).

(Continued)

*Primary Examiner* — Syed A. Zia
(74) *Attorney, Agent, or Firm* — Jenkins, Wilson, Taylor & Hunt, P.A.

(57) ABSTRACT

Methods, systems, and computer program products for firewall policy optimization are disclosed. According to one method, a firewall policy including an ordered list of firewall rules is defined. For each rule, a probability indicating a likelihood of receiving a packet matching the rule is determined. The rules are sorted in order of non-increasing probability in a manner that preserves the firewall policy.

42 Claims, 20 Drawing Sheets

U.S. PATENT DOCUMENTS

| | | | |
|---|---|---|---|
| 2003/0120622 A1* | 6/2003 | Nurmela et al. | 706/47 |
| 2004/0010712 A1* | 1/2004 | Hui et al. | 713/201 |
| 2004/0177139 A1* | 9/2004 | Schuba et al. | 709/223 |
| 2004/0193943 A1* | 9/2004 | Angelino et al. | 714/4 |
| 2005/0010765 A1 | 1/2005 | Swander et al. | |
| 2005/0125697 A1* | 6/2005 | Tahara | 713/201 |
| 2005/0183140 A1 | 8/2005 | Goddard | |
| 2005/0229246 A1* | 10/2005 | Rajagopal et al. | 726/14 |
| 2005/0251570 A1* | 11/2005 | Heasman et al. | 709/224 |
| 2006/0070122 A1 | 3/2006 | Bellovin | |
| 2006/0104202 A1* | 5/2006 | Reiner | 370/230 |
| 2006/0195896 A1 | 8/2006 | Fulp et al. | |
| 2008/0301765 A1* | 12/2008 | Nicol et al. | 726/1 |
| 2009/0138938 A1* | 5/2009 | Harrison et al. | 726/1 |
| 2010/0011433 A1* | 1/2010 | Harrison et al. | 726/12 |
| 2010/0199346 A1* | 8/2010 | Ling et al. | 726/12 |
| 2010/0303240 A1* | 12/2010 | Beachem et al. | 380/277 |
| 2011/0055916 A1* | 3/2011 | Ahn | 726/13 |
| 2011/0055923 A1* | 3/2011 | Thomas | 726/23 |

FOREIGN PATENT DOCUMENTS

| | | |
|---|---|---|
| KR | 10-20010079361 | 8/2001 |
| WO | WO 2006/093557 A2 | 9/2006 |

OTHER PUBLICATIONS

Notification of Transmittal of the International Search Report and The Written Opinion of the International Searching Authority, or the Declaration for International Application No. PCT/US05/47008 (Sep. 11, 2006).
E. Fulp, "Optimization of Network Firewall Policies Using Ordered Sets and Directed Acyclical Graphs", Technical Report, Computer Science Department, Wake Forest University, Jan. 2004.
E. Fulp et al., "Network Firewall Policy Tries", Technical Report, Computer Science Department, Wake Forest University, 2004.
E. Al-Shaer et al., "Modeling and Management of Firewall Policies", *IEEE Transactions on Network and Service Management*, 1(1): 2004.
E.W. Fulp, "Firewall Architectures for High Speed Networks", *U.S. Department of Energy Grant Application*, Funded Sep. 2003.
E. Al-Shaer et al., "Firewall Policy Advisor for Anomaly Discovery and Rule Editing", *Proceedings of the IFIP/IEEE International Symposium on Integrated Network Management*, 2003.
V.P. Ranganath, "A Set-Based Approach to Packet Classification", *Proceedings of the IASTED International Conference on Parallel and Distributed Computing and Systems*, 889-894, 2003.
M. Christiansen et al., "Using IDDs for Packet Filtering", *Technical Report, BRICS*, Oct. 2002.
L.Qui et al., "Fast Firewall Implementations for Software and Hardware-Based Routers", *Proceedings of ACM Sigmetrics*, Jun. 2001.
D. Eppstein et al., "Internet Packet Filter Management and Rectangle Geometry", *Proceedings of the Symposium on Discrete Algorithms*, 827-835, 2001.
E. Fulp, "Preventing Denial of Service Attacks on Quality of Service", *Proceedings of the 2001 DARPA Information Survivability Conference and Exposition II*, 2001.
S. Goddard et al., "An Unavailability Analysis of Firewall Sandwich Configurations" *Proceedings of the 6th IEEE Symposium on High Assurance Systems Engineering*, 2001.
G.V. Rooij, "Real Stateful TCP Packet Filtering in IP Filter", *Proceedings of the 10th USENIX Security Symposium*, 2001.
P. Warkhede et al., "Fast Packet Classification for Two-Dimensional Conflict-Free Filters", *Proceedings of IEEE INFOCOM*, 1434-1443, 2001.
D. Decasper et al., "Router Plugins: A Software Architecture for Next-Generation Routers", *IEEE/ACM Transactions on Networking*, 8(1): Feb. 2000.
A. Feldmann et al., "Tradeoffs for Packet Classification", *Proceedings of the IEEE INFOCOM*, 397-413, 2000.
X. Gan et al., "LSMAC vs. LSNAT: Scalable Cluster-based Web servers" *Journal of Networks, Software Tools, and Applications*, 3(3): 175-185, 2000.
A. Hari et al., "Detecting and Resolving Packet Filter Conflicts", *Proceedings of IEEE INFOCOM*, 1203-1212, 2000.
O. Paul et al., "A Full Bandwidth ATM Firewall", *Proceedings of the 6th European Symposium on Research in Computer Security ESORICS'2000*, 2000.
J. Xu et al., "Design and Evaluation of a High-Performance ATM Firewall Switch and Its Applications", *IEEE Journal on Selected Areas in Communications*, 17(6): 1190-1200, Jun. 1999.
C. Benecke, "A Parallel Packet Screen for High Speed Networks", *Proceedings of the 15th Annual Computer Security Applications Conference*, 1999.
R. Funke et al., "Performance Evaluation of Firewalls in Gigabit-Networks", *Proceedings of the Symposium on Performance Evaluation of Computer and Telecommunication Systems*, 1999.
S. Suri et al., "Packet Filtering in High Speed Networks", *Proceedings of the Symposium on Discrete Algorithms*, 969-970, 1999.
U. Ellermann et al., "Firewalls for ATM Networks", *Proceedings of INFOSEC'COM*, 1998.
V. Srinivasan et al., "Fast and Scalable Layer Four Switching", *Proceedings of ACM SIGCOMM*, 191-202, 1998.
M. Degermark et al., "Small Forwarding Tables for Fast Routing Lookups", *Proceedings of ACM SIGCOMM*, 4-13, 1997.
S.M. Bellovin et al., "Network Firewalls", *IEEE Communications Magazine*, 50-57, 1994.
W.E. Leland et al., "On the Self-Similar Nature of Ethernet Traffic", *IEEE Transactions on Networking*, 2(1); 15, 1994.
G. Brightwell et al., "Counting Linear Extensions is #P-Complete", *Proceedings of the Twenty-Third Annual ACM Symposium on Theory of Computing*, 1991.
M. Al-Suwaiyel et al., "Algorithms for Trie Compaction", *ACM Transactions on Database Systems*, 9(2): 243-263, Jun. 1984.
D. Comer, "Analysis of a Heuristic for Full Trie Minimization", *ACM Transactions on Database Systems*, 6(3): 513-537, Sep. 1981.
R.L. Graham et al., "Optimization and Approximation in Deterministic Sequencing and Scheduling: A Survey", *Annals of Discrete Mathematics*, 5: 287-326, 1979.
E.L. Lawler, "Sequencing Jobs to Minimize Total Weighted Completion Time Subject to Precedence Constraints", *Annals of Discrete Mathematics*, 2: 75-90, 1978.
J.K. Lenstra et al., "Complexity of Scheduling Under Precedence Constraints", *Operations Research*, 26(1): 22-35, 1978.
R. Rivest, "On Self-Organizing Sequential Search Heuristics", *Communications of the ACM*, 19(2): 1976.
W.E. Smith, "Various Optimizers for Single-Stage Production", *Naval Research Logistics Quarterly*, 3: 59-66, 1956.
Bellion, "High Performance Packet Classification", http://www.hipac.org (Publication Date Unknown).
Official Action for U.S. Appl. No. 11/316,331 (Sep. 14, 2009).
Communication pursuant to Rules 109 and 110 EPC for European application No. 05857614.1 (Aug. 31, 2007).
Notice of Allowance and Fee(s) Due for U.S. Appl. No. 11/316,331 (Mar. 4, 2011).
Supplementary European Search Report for European application No. 06758213.0 (Feb. 14, 2011).
Fulp, Errin: "Errin Fulp," XP002618346, www.cs.wfu.edu/'fulp/ewfPub.html (Downloaded from the Internet on Jan. 24, 2011), pp. 1-5.
Co-pending U.S. Appl. No. 12/871,806, filed Aug. 30, 2010).
Final Official Action for U.S. Appl. No. 11/316,331 (Jun. 23, 2010).
Acharya et al., "OPTWALL: A Hierarchical Traffic-Aware Firewall," Department of Computer Science, Telecommunications Program, University of Pittsburgh, pp. 1-11 (2007).
Tarsa et al., "Balancing Trie-Based Policy Representations for Network Firewalls," Department of Computer Science, Wake Forest University, pp. 1-6 (2006).
Fulp, "Trie-Based Policy Representations for Network Firewalls," Proceedings of the IEEE International Symposium on Computer Communications (2005).
Lee et al., "Development Framework for Firewall Processors," IEEE, pp. 352-355 (2002).
Office Action for Australian application No. 2006230171 (Sep. 10, 2010).
Office Action for Australian application No. 2005328336 (Aug. 20, 2010).

Notification of Transmittal of the International Search Report and the Written Opinion of the International Searching Authority, or the Declaration for International Application No. PCT/US2010/054520 (Apr. 27, 2011).

Communication pursuant to Rules 70(2) and 70a(2) EPC for European application No. 06758213.0 (Mar. 3, 2011).

* cited by examiner

| | | | | |
|---|---|---|---|---|
| $r_1$ | (UDP, | 1.1.*, | ACCEPT) | $p_1 = 0.01$ |
| $r_2$ | (TCP, | 1.*, | ACCEPT) | $p_2 = 0.02$ |
| $r_3$ | (TCP, | 2.*, | ACCEPT) | $p_3 = 0.17$ |
| $r_4$ | (UDP, | 1.*, | DENY) | $p_4 = 0.30$ |
| $r_5$ | (*, | *, | DENY) | $p_5 = 0.50$ |

FIG. 5A

| | | | | |
|---|---|---|---|---|
| $r_3$ | (TCP, | 2.*, | ACCEPT) | $p_3 = 0.17$ |
| $r_2$ | (TCP, | 1.*, | ACCEPT) | $p_2 = 0.02$ |
| $r_1$ | (UDP, | 1.1.*, | ACCEPT) | $p_1 = 0.01$ |
| $r_4$ | (UDP, | 1.*, | DENY) | $p_4 = 0.30$ |
| $r_5$ | (*, | *, | DENY) | $p_5 = 0.50$ |

FIG. 5B

| $r_1$ | (UDP, | 1.1.*, | ACCEPT) | $p_1 = 0.01$ |
| $r_4$ | (UDP, | 1.*, | DENY) | $p_4 = 0.30$ |
| $r_3$ | (TCP, | 2.*, | ACCEPT) | $p_3 = 0.17$ |
| $r_2$ | (TCP, | 1.*, | ACCEPT) | $p_2 = 0.02$ |
| $r_5$ | (*, | *, | DENY) | $p_5 = 0.50$ |

| | | | | |
|---|---|---|---|---|
| $r_1$ | (UDP, | 1.1.*, | ACCEPT) | $p_1 = 0.01$ |
| $r_4$ | (UDP, | 1.*, | ACCEPT) | $p_4 = 0.30$ |
| $r_{5a}$ | (UDP, | *, | DENY) | $p_{5a} = 0.47$ |
| $r_3$ | (TCP, | 2.*, | ACCEPT) | $p_3 = 0.17$ |
| $r_2$ | (TCP, | 1.*, | ACCEPT) | $p_2 = 0.02$ |
| $r_{5b}$ | (TCP, | *, | DENY) | $p_{5b} = 0.03$ |

METHODS, SYSTEMS, AND COMPUTER PROGRAM PRODUCTS FOR NETWORK FIREWALL POLICY OPTIMIZATION

RELATED APPLICATIONS

This application claims the benefit of U.S. Provisional Patent Application Ser. No. 60/665,664, filed Mar. 28, 2005; the disclosure of which is incorporated herein by reference in its entirety.

GOVERNMENT INTEREST

This invention was made with Government support under Grant No. DE-FG02-03ER25581 awarded by U.S. Department of Energy, Mathematical and Computational Information Sciences Division. The Government has certain rights in the invention.

TECHNICAL FIELD

The subject matter described herein relates to optimizing polices for network firewalls. More particularly, the subject matter described herein relates to methods, systems, and computer program products for optimizing performance of network firewalls.

BACKGROUND ART

Network firewalls remain the forefront defense for most computer systems. Guided by a security policy, these devices provide access control, auditing, and traffic control [3, 30, 31]. A security policy is a list of ordered rules, as seen in Table 1, that defines the action to perform on matching packets. For example, an accept action passes the packet into or from the secure network, while deny causes the packet to be discarded. In many implementations, the rule set is stored internally as a linked list. A packet is sequentially compared to the rules, starting with the first, until a match is found; otherwise, a default action is performed [30, 31]. This is referred to as a first-match policy and is used in many firewall systems including the Linux firewall implementation iptables [25].

TABLE 1

Example Security Policy Consisting of Multiple Ordered Rules

| No. | Proto. | Source | | Destination | | Action | Prob. |
| --- | --- | --- | --- | --- | --- | --- | --- |
| | | IP | Port | IP | Port | | |
| 1 | UDP | 1.1.* | * | * | 80 | deny | 0.01 |
| 2 | TCP | 2.* | * | 1.* | 90 | accept | 0.02 |
| 3 | UDP | * | * | 1.* | * | accept | 0.10 |
| 4 | TCP | 2.* | * | 1.* | 20 | accept | 0.17 |
| 5 | UDP | 1.* | * | * | * | accept | 0.20 |
| 6 | * | * | * | * | * | deny | 0.50 |

Traditional firewall implementations consist of a single, dedicated machine, similar to a router, that sequentially applies rules to each arriving packet. However, packet filtering represents a significantly higher processing load than routing decisions [24, 29, 31]. For example, a firewall that interconnects two 100 Mbps networks would have to process over 300,000 packets per second [30]. Successfully handling these traffic loads becomes more difficult as rule sets become more complex [4, 22, 31]. Furthermore, firewalls must be capable of processing even more packets as interface speeds increase. In a high-speed environment (e.g. Gigabit Ethernet), a single firewall can easily become a bottleneck and is susceptible to DoS attacks [4, 9, 13, 14]. An attacker could simply inundate the firewall with traffic, delaying or preventing legitimate packets from being processed.

One approach to increase firewall performance focuses on improving hardware design. Current research is investigating different distributed firewall designs to reduce processing delay [4, 9, 22], and possibly provide service differentiation [11]. Another approach focuses on improving performance via better firewall software [6, 7, 12, 16, 17, 24]. Similar to approaches that address the longest matching prefix problem for packet classification [8, 10, 25, 28], solutions typically represent the firewall rule set in different fashions (e.g. tree structures) to improve performance. While both approaches, together or separate, show great promise, each requires radical changes to the firewall system, and therefore are not amenable to current or legacy systems.

Accordingly, there exists a need for improved methods, systems, and computer program products for network firewall policy optimization.

SUMMARY

The subject matter described herein includes methods, systems, and computer program products for network firewall policy optimization. According to one method, a firewall policy including an ordered list of firewall rules is defined. For each rule, a probability indicating a likelihood of receiving a packet matching the rule is defined. Neighboring rules are sorted in order of non-increasing probability in a manner that preserves the firewall policy.

As used herein, the term "firewall" refers to a logical entity that is adapted to filter packets at the ingress and/or egress portions of a network based on a policy. The term "firewall" is intended to include systems that block packets from entering or leaving a network and systems that perform intrusion detection and intrusion protection functions for packets entering or leaving a network. Thus, the methods and systems described herein for firewall policy optimization can be used to optimize policies for intrusion detection and intrusion protection firewalls.

The subject matter described herein includes a method to improve firewall performance and lower packet delay that can be applied to both legacy and current systems. In one implementation, a firewall rule set may be reordered to minimize the average number of rule comparisons to determine the action, while maintaining the integrity of the original policy. Integrity is preserved if the reordered and original rules always arrive at the same result. To maintain integrity, a firewall rule set may be modeled as a Directed Acyclical Graph (DAG), where vertices are firewall rules and edges indicate precedence relationships. Given this representation, any linear arrangement of the DAG is proven to maintain the original policy integrity. Unfortunately, determining the optimal rule order from all the possible linear arrangements is proven to be NP-complete, since it is equivalent to sequencing jobs with precedence constraints for a single machine [15]. Although determining the optimal order is NP-complete, a heuristic will be described below to order firewall rules that reduces the average number of comparisons while maintaining integrity. Simulation results show the proposed reordering method yields rule orders that are comparable to optimal; thus, provides a simple means to significantly improve firewall performance and lower packet delay.

The subject matter described herein for network firewall policy optimization may be implemented using any combination of hardware, software, or firmware. For example, the subject matter described herein may be implemented using a non-transitory machine-accessible and readable medium having stored thereon machine-executed instructions for controlling the machine to perform steps. Exemplary machine readable media suitable for implementing the subject matter described herein include disk memory devices, chip memory devices, programmable logic devices, application specific integrated circuits, and downloadable electrical signals. In addition, a machine readable medium that implements the subject matter described herein may be implemented using a single device or computing platform or may be distributed across multiple devices or computing platforms.

BRIEF DESCRIPTION OF THE DRAWINGS

Preferred embodiments of the subject matter described herein will now be explained with reference to the accompanying drawings of which:

FIG. 5A is a table illustrating a firewall policy before sorting;

FIG. 5B is a table illustrating a sorted version of the firewall policy of FIG. 5A;

DETAILED DESCRIPTION OF THE INVENTION

Modeling Firewall Security Policies

Figure 1A:
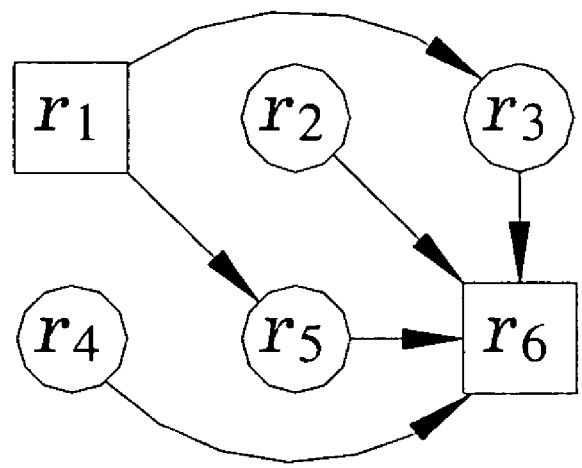
FIG. 1A is a block diagram of a rule list Directed Acyclical Graph (DAG) for the firewall rules in Table 1.

As described above, a firewall rule set, also known as a firewall policy, is traditionally an ordered list of firewall rules. Firewall policy models have been the subject of recent research [1, 2, 16]; however, the primary purpose is anomaly detection and policy verification. In contrast, the policy model described in this herein is designed for firewall performance optimization and integrity. Firewall performance refers to reducing the average number of comparisons required to determine an action, while integrity refers to maintaining the original policy intent. Although improving the worst-case performance is important, it is not possible without changing the list-based representation [16, 24].

Firewall Rule and Policy Models

In the examples described herein, a rule r is modeled as an ordered tuple of sets, $r=(r[1], r[2], \ldots, r[k])$. Order is necessary among the tuples since comparing rules and packets requires the comparison of corresponding tuples. Each tuple $r[l]$ is a set that can be fully specified, specify a range, or contain wildcards '*' in standard prefix format. For the Internet, security rules are commonly represented as a 5-tuple consisting of: protocol type, IP source address, source port number, IP destination address, and destination port number [30, 31]. Given this model, the ordered tuples can be supersets and subsets of each other, which forms the basis of precedence relationships. In addition to the prefixes, each filter rule has an action, which is to accept or deny. However, the action will not be considered when comparing packets and rules. Similar to a rule, a packet (IP datagram) d can be viewed as an ordered k-tuple $d=(d[1], d[2], \ldots, d[k])$; however, ranges and wildcards are not possible for any packet tuple.

Using the previous rule definition, a standard security policy can be modeled as an ordered set (list) of n rules, denoted as $R=\{r_1, r_2, \ldots, r_n\}$. A packet d is sequentially compared against each rule $r_i$ starting with the first, until a match is found ($d \Rightarrow r_i$) then the associated action is performed.

A match is found between a packet and rule when every tuple of the packet is a subset of the corresponding tuple in the rule.
Definition Packet d matches $r_i$ if
$d \Rightarrow r_i$ iff $d[l] \subseteq r_i[l]$, $l=1, \ldots, k$ The rule list $\overline{R}$ is comprehensive if for every possible legal packet d a match is found using R. Furthermore, two rule lists R and R' are equivalent if for every possible legal packet d the same action is performed by the two rule lists. If R and R' are different (e.g. a reorder) and the lists are equivalent, then the policy integrity is maintained.

As previously mentioned, a rule list has an implied precedence relationship where certain rules must appear before others if the integrity of the policy is to be maintained. For example consider the rule list in Table 1. Rule $r_1$ must appear before rules $r_3$ and $r_5$, likewise rule $r_6$ must be the last rule in the policy. If for example, rule $r_3$ was moved to the beginning of the policy, then it will shadow [2] the original rule $r_1$. However, there is no precedence relationship between rules $r_2$ and $r_4$ given in Table 1. Therefore, the relative ordering of these two rules will not impact the policy integrity and can be changed to improve performance. The present example assumes that the original policy is free from any anomalies. Likewise, when a policy is reordered to improve performance it should not introduce any anomalies, which will occur if precedence relationships are not maintained. As a result, a model is needed to effectively represent precedence relationships.

Modeling Rule List Precedence Relationships

The precedence relationship between rules in a policy will be modeled as a Directed Acyclical Graph (DAG) [23, 18]. Such graphs have been successfully used to represent the relative order of individual tasks that must take place to complete a job (referred to as a task graph model). Since certain rules must appear before others to maintain policy integrity, this structure is well suited for modeling the precedence of firewall rules. Let $G=(R, E)$ be a rule list DAG for a rule list R, where vertices are rules and edges E are the precedence relationships (constraint). A precedence relationship, or edge, exists between rules $r_i$ and $r_j$, if $i<j$, the actions for each rule are different, and the rules intersect.

Definition The intersection of rule $r_i$ and $r_j$, denoted as $r_i \cap r_j$, is
$r_i \cap r_j = (r_i[l] \cap r_j[l])$, $l=1, \ldots, k$ Therefore, the intersection of two rules results in an ordered set of tuples that collectively describes the packets that match both rules. The rules $r_i$ and $r_j$ intersect if every tuple of the resulting operation is non-empty. In contrast, the rules $r_i$ and $r_j$ do not intersect, denoted as $r_i \overline{\cap} r_j$, if at least one tuple is the empty set. Note the intersection operation is symmetric; therefore, if $r_i$ intersects $r_j$, then $r_j$ will intersect $r_i$. The same is true for rules that do not intersect.

Figure 1B:
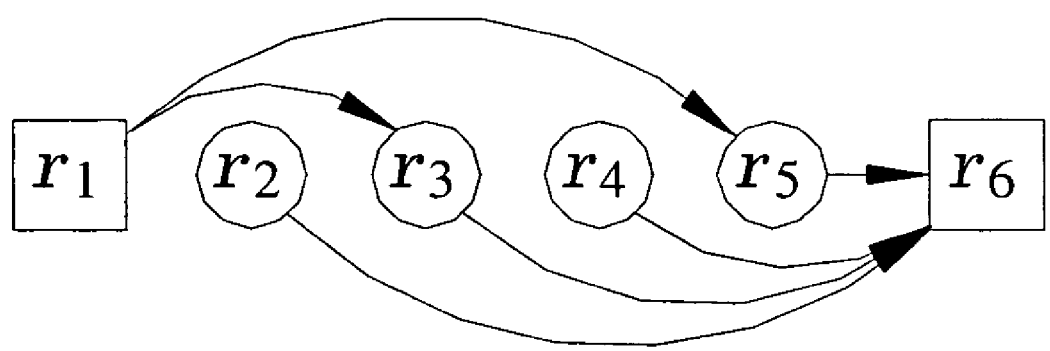
FIG. 1B is a linear arrangement of firewall rules corresponding to the original rule order.

For example consider the rules given in Table 1, the intersection of $r_1$ and $r_3$ yields (UDP, 1.1.*, *, 1.*, 80). Again, the rule actions are not considered in the intersection or match operation. Since these two rules intersect, a packet can match both rules for example d=(UDP, 1.1.1.1, 80, 1.1.1.1, 80). Furthermore, the actions of the two rules are different. Therefore, the relative order must be maintained between these two rules and an edge drawn from $r_1$ to $r_3$ must be present in the rule list DAG, as seen in FIGS. 1A and 1B. More particularly, FIG. 1A illustrates a rule list DAG for the rules in Table 1. FIG. 1B illustrates a linear arrangement of the rules in FIG. 1A. In FIGS. 1A and 1B, the vertices represent rules, the circles represents an accept rules, and the squares represents deny rules. Edges that connect the vertices represent precedence requirements. As can be seen from FIG. 1B, because of the edge between rules $r_1$ and $r_3$, precedence between rules $r_1$ and $r_3$ must be maintained. In contrast consider the intersection of rules $r_3$ and $r_5$. These two rules intersect, indicating packets belonging to the set (UDP, 1.*, *, 1.*, *) would match both rules. However, it does not matter which of the two rules a packet matches first, since the action is the same for both rules. Therefore, an edge does not exist between rules $r_3$ and $r_5$ in the diagram. Similarly, rules $r_2$ and $r_4$ do not intersect due to the fifth tuple (destination port). A packet cannot match both rules indicating the relative order can change; therefore, an edge will not exist between them.

The match operation can be used to identify precedence relationships, but it cannot do so in every case. Consider a partial-match example [1], where $r_a$=(UDP, *, 80, 10.*, 90, accept) and $r_b$=(UDP, 10.*, 80, *, 90, deny). The intersection of $r_a$ and $r_b$ is (UDP, 10.*, 80, 10.*, 90); therefore a packet, such as d=(UDP, 10.10.10.10, 80, 10.10.10.10, 90), can match both rules. If $r_a$ appears before $r_b$ then the packet d is accepted, but if $r_b$ occurs before $r_a$ then d is rejected. As a result, the order of $r_a$ and $r_b$ in the original policy must be maintained. However, the match operation is unable to identify the precedence in this example. A partial match exists in between rules $r_3$ and $r_5$ in Table 1, but as previously discussed an edge does not exist between the rules since the actions are the same.

Using the rule list DAG representation a linear arrangement is sought that improves the firewall performance. As depicted in FIG. 1B, a linear arrangement (permutation or topological sort) is a list of DAG vertices where all the successors of a vertex appear in sequence after that vertex [23]. Therefore it follows that a linear arrangement of a rule list DAG represents a rule order, if the vertices are read from left to right. Furthermore, it is proven in the following theorem that any linear arrangement of a rule list DAG maintains integrity.

Theorem Any linear arrangement of a rule list DAG maintains integrity.

Proof Assume a rule list DAG G is constructed from the security policy R that is free of anomalies. Consider any two rules $r_i$ and $r_j$ in the policy, where $i<j$. If an edge between $r_i$ and $r_j$ in G does not exist, then a linear arrangement of G can interchange the order of the two rules. An edge will not exist if the rules do not intersect; however, a reorder will not affect integrity since a packet cannot match both rules. Shadowing is not introduced due to the reorder since the intersection operation is symmetric. An edge will not exist if the two rules intersect but have the same action; however, a reorder will not affect integrity since the same action will occur regardless of which rule is matched first. If an edge does exist between the rules, then their relative order will be maintained in every linear arrangement of G; thus maintaining precedence and integrity.

Rule List Optimization

As described above, it is important to inspect packets as quickly as possible given increasing network speeds and QoS requirements. Using the rule list DAG to maintain policy integrity, a linear arrangement is sought that minimizes the average number of comparisons required. However, this will require information not present in the firewall rule list. Certain firewall rules have a higher probability of matching a packet than others. As a result, it is possible to develop a policy profile over time that indicates frequency of rule matches (similar to cache hit ratio). Let $P=\{p_1, p_2, \ldots, p_n\}$ be the policy profile, where $p_i$ is the probability that a packet will match rule i (first match in the policy). Furthermore, assume a packet will always find a match, $\Sigma_{i=1}^{n} p_i = 1$; therefore R is comprehensive. Using this information, the average number of rule comparisons required is $$E[n] = \sum_{i=1}^{n} i \cdot p_i \quad (1)$$

For example, the average number of comparisons required for the rule set in Table 1 is 5.03.

Given a rule list DAG G=(R, E) and policy profile P={$p_1$, $p_2$, ..., $p_n$} a linear arrangement π of G is sought that minimizes Equation 1. In the absence of precedence relationships, the average number of comparisons is minimized if the rules are sorted in non-increasing order according to the probabilities [26], which is also referred to as Smith's algorithm [27]. Precedence constraints cause the problem to be more realistic; however, such constraints also make determining the optimal permutation more problematic.

Determining the optimal rule list permutation can be viewed as job scheduling for a single machine with precedence constraints [15, 21]. The notation for such scheduling problems is α|β|γ|δ, where α is the number of machines, β is the precedence (or absence of) which can be represented as a DAG, γ is a restriction on processing time, and δ is the optimality criterion [15]. Determining the optimal rule order is similar to the 1|β|1|ΣωC$_i$ scheduling problem, or optimality criterion, where ω is a weight associated with a job (for example, importance) and C$_i$ is the completion time. As previously noted, the 1∥ΣωC$_i$ problem can be solved in linear time the using Smith's algorithm [27], which orders jobs according to non-decreasing $$\frac{t_i}{\omega}$$

ratio, where $t_i$ is the processing time of job i. In this case set $t_i$=1 and ω=$p_i$∀i. However, Lawler [19] and Lenstra et al. [21] proved 1|β|1|ΣωC$_i$ to be NP-complete via the linear arrangement problem, which implies determining the optimal firewall rule order is also NP-complete. Note, determining the number of possible permutations has been proven to be NP-hard [5].

Theorem 1|β|1|ΣωC$_i$α Determining the optimal order of a firewall rule list

Proof Consider the 1|β|1|ΣωC$_i$ problem. Each of n jobs J$_i$, i∈I, has to be processed without preemption on a single machine that can handle at most one job at a time. For each i∈I, let ω be the associated weight. Furthermore, let G=(V, E) be a DAG that represents the precedence order of the jobs J$_i$. Assume the processing time of each job equals 1 time unit, the weights to be 0≦ω≦1 such that Σω=1, and β, which is G, to be a rule list DAG. In this case, the optimization criterion Σω·C$_i$ is the same as Σp$_i$·i, which is given in equation 1. Clearly, the optimal firewall rule ordering problem has a solution if and only if 1|β|1|ΣωC$_i$ has a solution. Therefore, determining the optimal permutation of firewall rules is NP-complete.

Exemplary Rule Sorting Algorithm

Although determining the optimal rule permutation was proven to be NP-complete, reducing the average number of comparisons required to process a packet remains an important objective. As previously discussed, a sorting algorithm must maintain the precedence relationships among rules. Of course an exhaustive search is possible if the number of rules is small (generate and test all possible topological orders); however as proven in the previous section, this is not feasible with a realistic rule list.

One exemplary algorithm starts with the original the rule set, then sorts neighboring rules based on nonincreasing probabilities. However, an exchange of neighbors should never occur if the rules intersect and have different actions. This test preserves any precedence relationships in the policy. For example, the following sorting algorithm uses such a comparison to determine if neighboring rules should be exchanged. Note $a_i$ denotes the action associated with the $i^{th}$ rule.

```
done = false
while(!done)
    done = true
    for(i = 1; i <n; i++)
        if(p_i < p_{i+1} AND (r_i ⋒ r_{i+1} OR a_i == a_{i+1}))then
            exchange rules, actions, and probabilities
            done = false
        endif
    endfor
endwhile
```

Figure 2A:
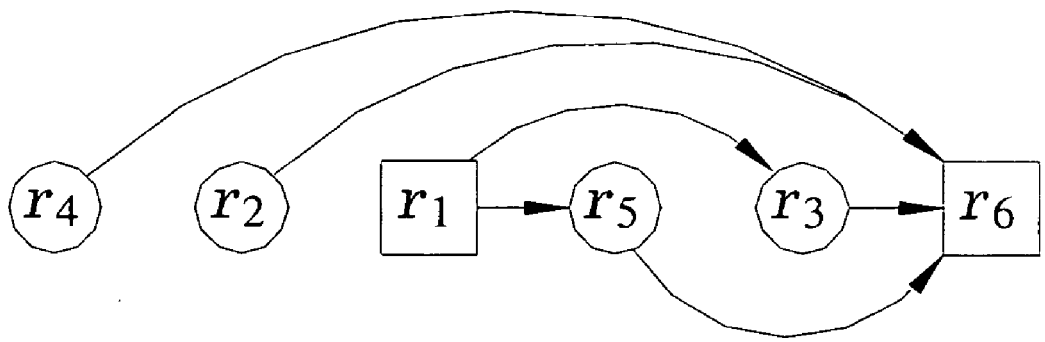
FIG. 2A is a policy DAG representing a reordered version of the firewall rule set in FIG. 1 after sorting.
Figure 2B:
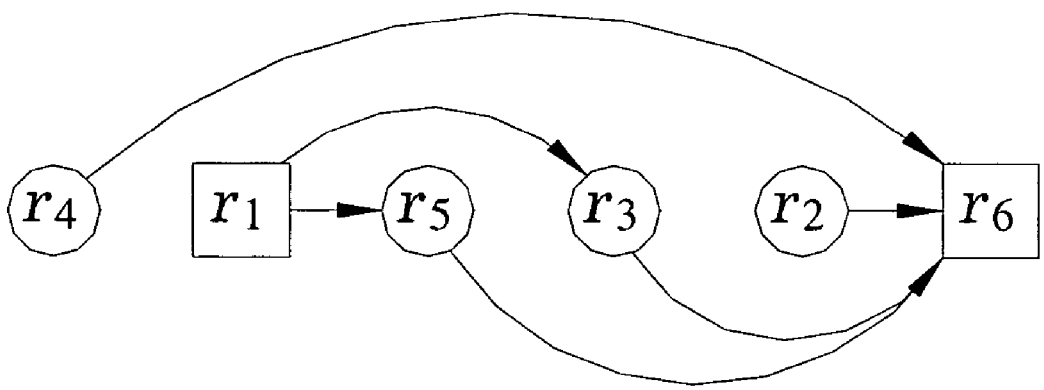
FIG. 2B is a policy DAG for the rule set illustrated in Table 1 illustrating an optimal rule order.

Other sorting algorithms are possible if the completion time of the sort is an issue; however, the method presented is easy to implement and only requires a simple neighbor comparison. Assume the match probabilities for the rule list given in Table 1. Applying the sorting algorithm to this rule list results in the ordering depicted in FIG. 2A, which has 10% fewer comparisons on average. However when using the algorithm, it is possible that one rule can prevent another rule from being reordered. For example, rule $r_1$ prevents rule $r_5$ from being placed closer to the beginning of the rule set. However, if both rules $r_1$ and $r_5$ are placed closer to the beginning of the policy while maintaining their relative order, the average number of comparison will be further reduced, 15% fewer. This is the optimal order for the 6 rule set, which is depicted in FIG. 2B. Although this simple sorting algorithm is unable to move groups of rules, it can still improve the performance of the firewall system. Its effectiveness is measured experimentally in the next section.

Experimental Results

In this section, the average number of rule comparisons required after sorting the rules is compared with average number of comparisons required using the original order and the optimal order. Note the optimal rule ordering was determined via an exhaustive search. As a result, it was not feasible to determine the optimal ordering once the number of rules equaled 15 given the number of permutations to consider. Two different variations of the rule sorting method described in the preceding section were implemented. The difference between the methods was the comparison used to determine if neighboring rules should be exchanged. The first sorting algorithm exchanged neighboring rules if they were out of order and did not intersect. The if-condition was as follows.

```
if (p_i < p_{i+1} AND r_i ⋒ r_{i+1}) then
```

Therefore, rule actions were not considered and the method will be referred to as non-action sort. The second sorting method did consider the rule action (as described in the preceding section) and will be referred to as action sort. The comparison between the two sorting algorithms will indicate the importance of considering rule actions when ordering rules.

In the first experiment, lists of 10 firewall rules were generated with random precedence relationships. The match probability of each rule was given by a Zipf distribution [20], which assigns probabilities according to the rank of an item. For this simulation, the last rule had the highest probability which is consistent with most policies (last rules are more general). As a result, the original order yields the worst average number of comparisons. The intersection percentage measured the percentage of rules that intersect in the policy. This metric gives a value for the dependency level in the policy; however note, rule action is not considered when calculating this metric. Rules were equally likely to have an accept or deny action and the results (average number of rule comparisons) for a particular intersection percentage were averaged over 1000 simulations.

Figure 3A:
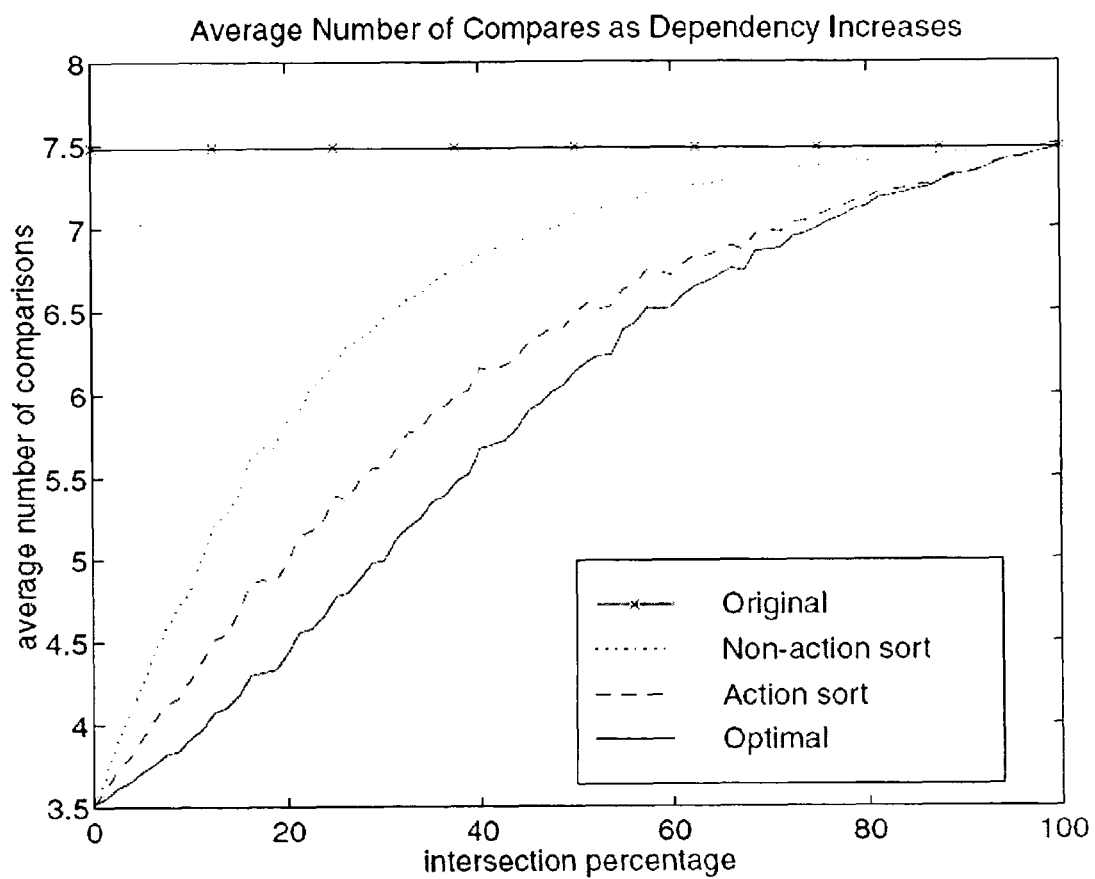
FIG. 3A is a graph illustrating average numbers of packet comparisons versus intersection percentage for different orderings of a firewall policy.
Figure 3B:
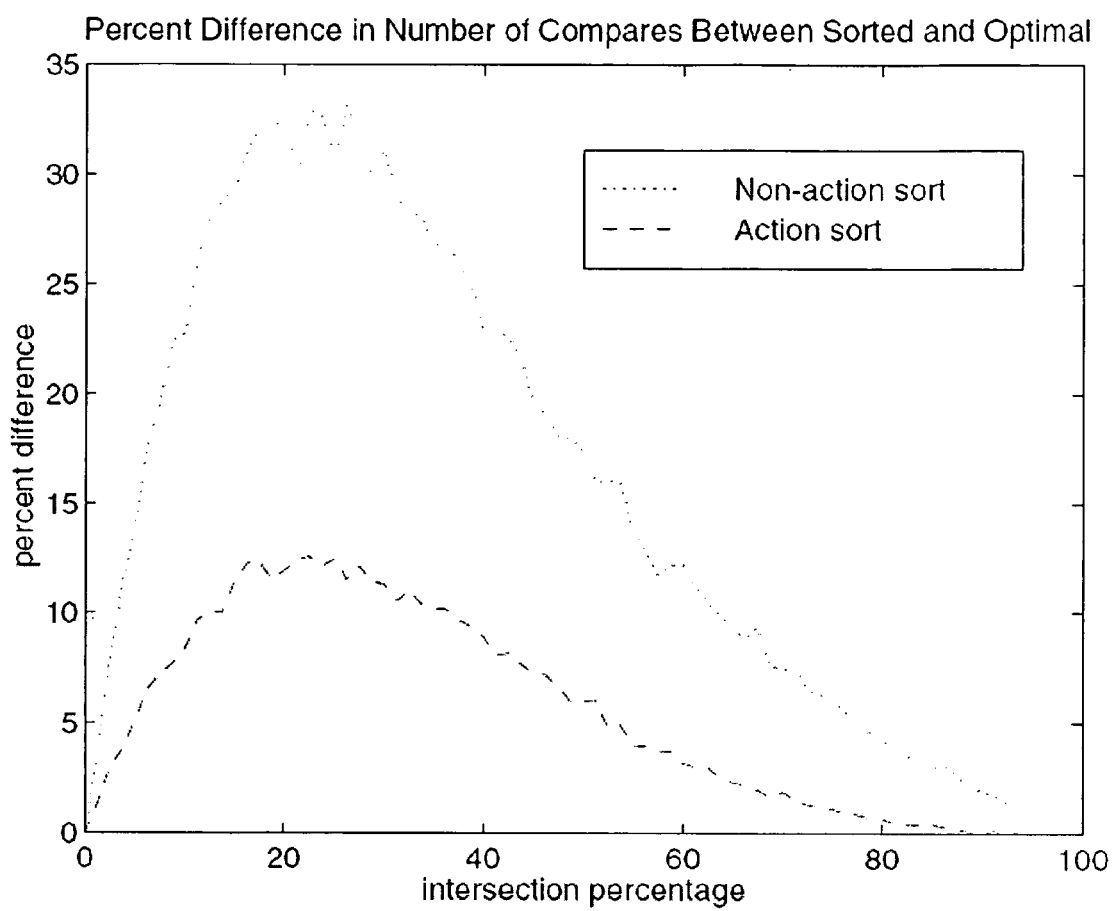
FIG. 3B is a graph illustrating the percent difference in average numbers of packet comparisons between sorted and optimal sortings of a firewall policy.

Results of the first experiment are given in FIGS. 3A and 3B. More particularly, FIG. 3A is a graph illustrating the average number of packet comparisons versus intersection percentage for the original rule sorting, the non-action sort, the action sort, and the optimal sort. FIG. 3B is a graph illustrating the percent difference in the average number of comparisons required between the sorted and optimal firewall policy configurations. The average number of comparisons required was lower for the sorted and the optimal lists when the intersection percentage was low, as seen in FIG. 3A. This was expected since there is a large number of possible rule permutations (few edges in the DAG). When the intersection percentage approached 100%, the values converged to the number required for the original list. This is due to the limited number of possible rule orders, only one order in the extreme case. The percent difference between the sorted and optimal order is shown in FIG. 3B. At zero intersection percentage the sorted and optimal orders are equal, since any ordering is possible. Similarly at an intersection percentage of 100, the sorted and optimal orders are equal since only one order is possible. Between these two extremes, the action sorting algorithm remains close to the optimal value. In contrast, the non-action sort had a maximum difference of 33%.

Figure 4A:
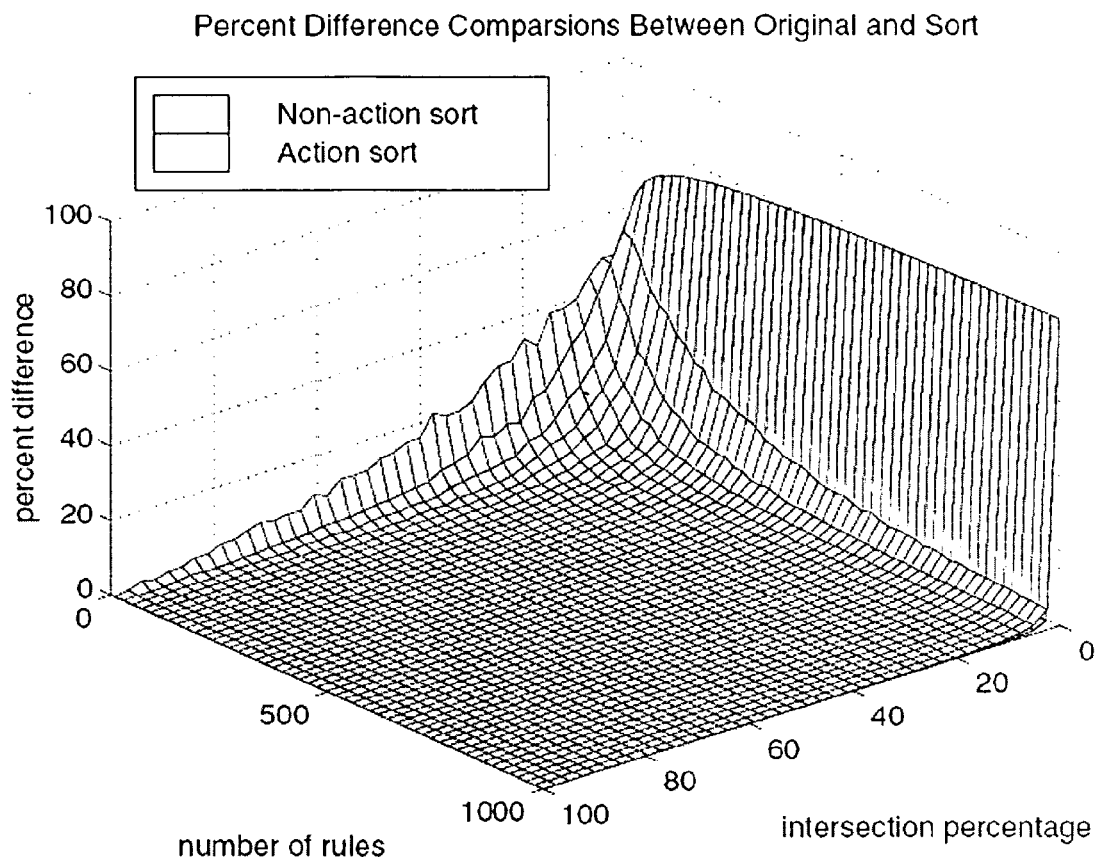
FIG. 4A is a graph of percent difference comparisons between original and sorted versions of a firewall policy.

The benefit of rule sorting on larger policies is also of interest; however as previously described, it was not possible to determine the optimal ordering once the number of rules approaches 15. Therefore, the second experiment used larger rule sets, but only compared the original order and the sorted orders. The number of rules ranged from 10 to 1000, while the matching probabilities and intersection percentages were the same as the previous experiment. The results of this experiment are depicted in FIG. 4A. The sorted rule sets always performed equal to or better than the original order, while the action sort consistently performed better than the non-action sort. As noted in the previous experiment, the percent difference is very large given few intersections (e.g. 80% decrease for 1000 rules with 0% dependency), but approaches zero as all the rules intersect. As the number of rules increases, sorting is increasingly beneficial, although only at low intersection percentages. The benefit of sorting drops more significantly as the intersection percentage increases with larger rule sets. This is primarily due to the low matching probabilities of each rule, which requires a complete reordering to have a significant impact on the average number of comparisons. As a result, large rule sets can benefit from sorting if the intersection percentage is low.

Figure 4B:
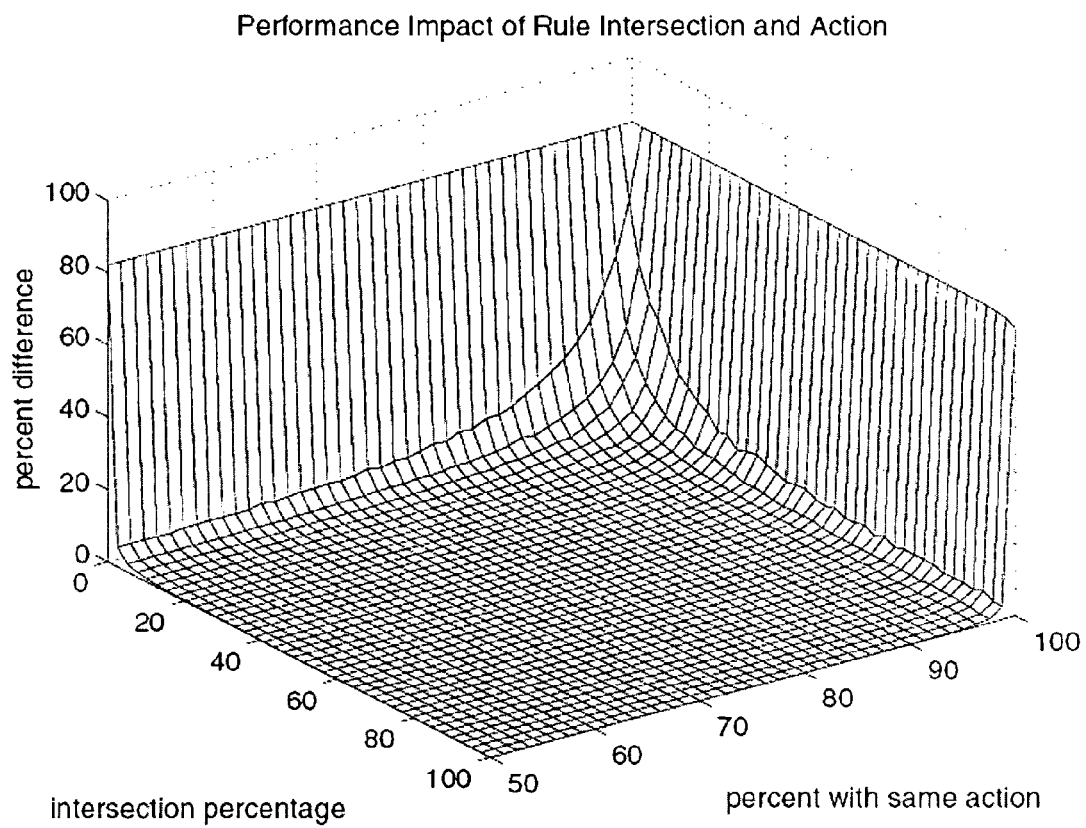
FIG. 4B is a graph illustrating the performance impact of considering rule intersection and actions in performing firewall rule sorting.

The impact of considering rule actions when sorting is illustrated in FIG. 4B. In this experiment lists of 1000 rules were generated, where the intersection percentages ranged from 0% to 100% and the percentage of rules with the same action varied from 50% to 100%. The performance of the action sort to the original list was then compared. As the percentage of rules with the same action increased, the percent difference (reduction) in the average number of comparisons also increased. This is due to the increased number of permutations possible when the rule actions are increasingly the same (fewer edges in the rule list DAG to consider). This is depicted in FIG. 4B where a policy with a 100% intersection percentage can significantly reduce the number of comparisons (80% reduction) if all the rules have the same action. This performance increase is not possible with the non-action sort. Therefore, considering the rule action increases the number of possible rule orders, thereby providing more possibilities to improve firewall performance.

Conclusions

Network firewalls enforce a security policy by comparing arriving packets to a list of rules. An action, such as accept or deny, is then performed on the packet based on the matching rule. Unfortunately packet filtering can impose significant delays on traffic due to the complexity and size of rule sets. Therefore, improving firewall performance is important, given network Quality of Service (QoS) requirements and increasing network traffic loads.

The sections above describe rule ordering methods to improve the performance of network firewalls. Assuming each rule has a probability of a packet matching, firewall rules should be sorted such that the matching probabilities are non-increasing. This reduces the average number of comparisons and the delay across the firewall. However, a simple sort is not possible given precedence relations across rules. It is common in a security policy that two rules may match the same packet yet have different actions. It is this precedence relationship between rules that must be maintained to preserve integrity. The method described above uses Directed Acyclical Graphs (DAG) to represent the precedence order rules must maintain. Given this representation, a topological sort can be used to determine the optimal order (minimum average number of comparisons); however, the examples above prove this problem to be NP-complete (similar to job scheduling for a single nonpreemptive machine with precedence constraints). As an alternative, a simple sorting method was introduced that maintained the precedence order of the rules. Simulation results indicate this method can significantly reduce the average number of comparisons required and is comparable to optimal ordering.

Several areas exist for future research in optimizing firewall rule lists. The sorting method proposed above is based on a simple algorithm. Although it can offer an improvement over the original rule order, algorithms that can move groups of rules could provide a larger reduction in the average number of comparisons. The effect of stateful firewalls should also be addressed in future research. Security can be enhanced with connection state and packet audit information. For example, a table can be used to record the state of each connection, which is useful for preventing certain types of attacks (e.g., TCP SYN flood) [30, 31]. The impact of such rules on the firewall needs to be investigated and whether sorting can be done on-line to reflect temporal changes. In addition, more research is needed to determine more accurate probability distributions for packet matching and dependency percentages. Given this information, better algorithms can be designed and more realistic simulations can be performed.

Trie-Based Network Firewall Optimization Methods and Rule Splitting Overview

As described above, while assuring firewall policy integrity is critical, performance is equally important given increasing network speeds and traffic volumes. Firewall processing delay can be reduced via hardware as well as policy optimization, where rules are manipulated to reduce the number of comparisons. For a given firewall installation, it can be determined that certain security rules have a higher probability of matching a packet than others. As a result, it is possible to develop a policy profile over time that indicates frequency of rule matches (similar to cache hit ratio). Given this information, trie-based methods are described herein to minimize the average number of comparisons required per packet. Although most firewall systems still utilize an ordered list representation, the proposed enhancements still are applicable to current firewall systems since a policy trie can be converted into an ordered list using an in order traversal.

Rule Sorting

As described above, rule sorting of neighboring rules based on ascending probabilities in a manner that considers rules intersection and rule actions can be used to improve firewall performance by reducing the number of packet comparisons. The methods described above use Directed Acyclic Goal Graphs (DAGs) to represent firewalls. The methods described in this section will use the rule sorting algorithms in combination with policy trie representations to perform sorting of groups of rules in a manner that improves firewall performance.

In this example, it is assumed that a security policy contains a list of n ordered rules, $\{r_1, r_2, \ldots, r_n\}$. In addition, let $p_i$ represent the probability that a packet will match rule i (first match in the policy). Therefore, the policy is comprehensive, which means every packet will have a match, if $\Sigma_{i=1}^{n} p_i = 1$. Using this information, the average number of rule comparisons required can be calculated as $$E[n] = \sum_{i=1}^{n} i \cdot p_i$$

The average number of comparisons is minimized if the rules are sorted in non-ascending order according to the probabilities. However, this can only be achieved if the sorting algorithm considers the probabilities and whether one rule is a superset of another. For example, sorting algorithms must use the following comparison to determine if neighboring rules should be interchanged Note, $a_i$ denotes the action associated with the $i^{th}$ rule.

if ($p_i < p_{i+1}$ AND $r_i \cap r_{i+1}$ OR $a_i == a_{i+1}$)) then

Sorting rules in this fashion can have positive impact on the average number of comparisons required. FIG. 5A is a table illustrating a firewall policy prior to rule sorting. The expected number of comparisons for the policy of FIG. 5A is 4.26 comparisons per packet. FIG. 5B is a table illustrating the firewall policy of FIG. 5A after sorting using the above-described algorithm. In FIG. 5B, the expected number of comparisons per packet has been reduced to 3.94. Thus, using the method described above, the number of comparisons per packet can be reduced by 8%.

However, it can be seen from FIGS. 5A and 5B that one rule can prevent another rule from being reordered. For example in FIG. 5B, rule $r_1$ prevents rule $r_4$ from being placed closer to the beginning of the rule set. However, if both rules $r_1$ and $r_4$ are placed closer to the beginning of the policy while maintaining their relative order, the average number of comparison will be reduced.

To solve this problem, rule sets can be sorted a using policy tries. First, the rule list is converted into an equivalent policy trie. Each sub-trie will have an associated probability $\bar{p}$ that is average probability (hit-ratio) of the rules comprising the sub-trie. Sub-tries can be rotated around their parent node to increase performance, using the method described earlier.

Figures 6A, 6B:
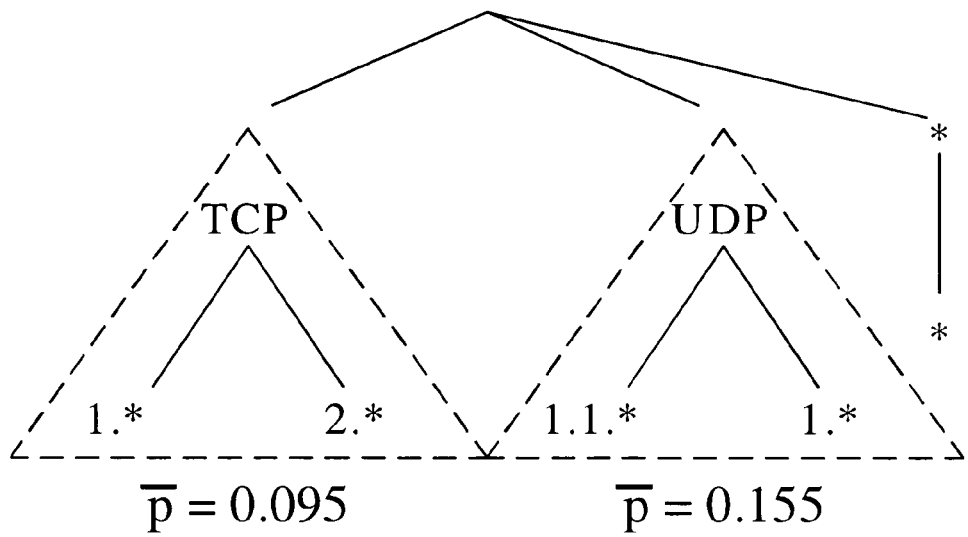
FIG. 6A is a policy trie representation of the firewall policy of FIG. 5B.
FIG. 6B is a table representing the firewall policy of FIG. 5A after TCP and UDP sub-trie rotation.

Since the policy trie (or equivalent rule set) is tested from left to right, rotation should occur if the probability of the right sub-trie is greater than the left sub-trie. As a result, the average number of comparisons required will be reduced and the policy integrity is maintained. FIG. 6A is a trie representation of the rules in FIG. 5B. FIG. 6B is a table representing resulting rule set after rotating the TCP and UDP sub-tries. The TCP sub-trie in FIG. 6A has an expected packet matching probability of 0.095 while the UDP sub-trie has an expected packet matching probability of 0.155. Thus, the UDP sub-trie and the TCP sub-trie should be rotated so that the UDP sub-trie becomes the left sub-trie and the TCP sub-trie becomes the right sub-trie. In the table illustrated in FIG. 6B, which lists the ordering of the rules after rotating the sub-tries, the average number of comparisons per packets has been reduced to 3.70.

Rule Splitting

Figures 7A, 7B:
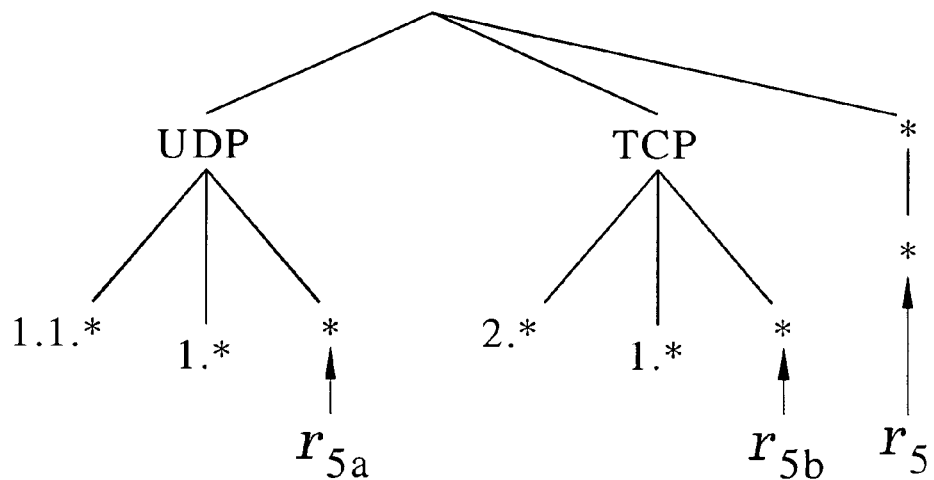
FIG. 7A is a policy trie illustrating the splitting of rule $r_5$ into rules $r_{5a}$ and $r_{5b}$.
FIG. 7B is a table illustrating the firewall policy of FIG. 5A after splitting rule $r_5$ into rules $r_{5a}$ and $r_{5b}$.

Rule splitting takes a general rule and creates more specific rules that collectively perform the same action over the same set of packets. Here, rule splitting is used to reduce the average number of comparisons. For example in FIG. 7A, rule $r_5$ is split into two separate rules, $r_{5a}$ for UDP and $r_{5b}$ for TCP. FIG. 7B is a table corresponding to the policy trie of FIG. 7A. Once the rules are positioned based on their probabilities and their relation to other rules, the average number of rule comparisons is reduced to 2.98 (after sort, trie rotation, and splitting) which is a 30% less.

Figure 8A:
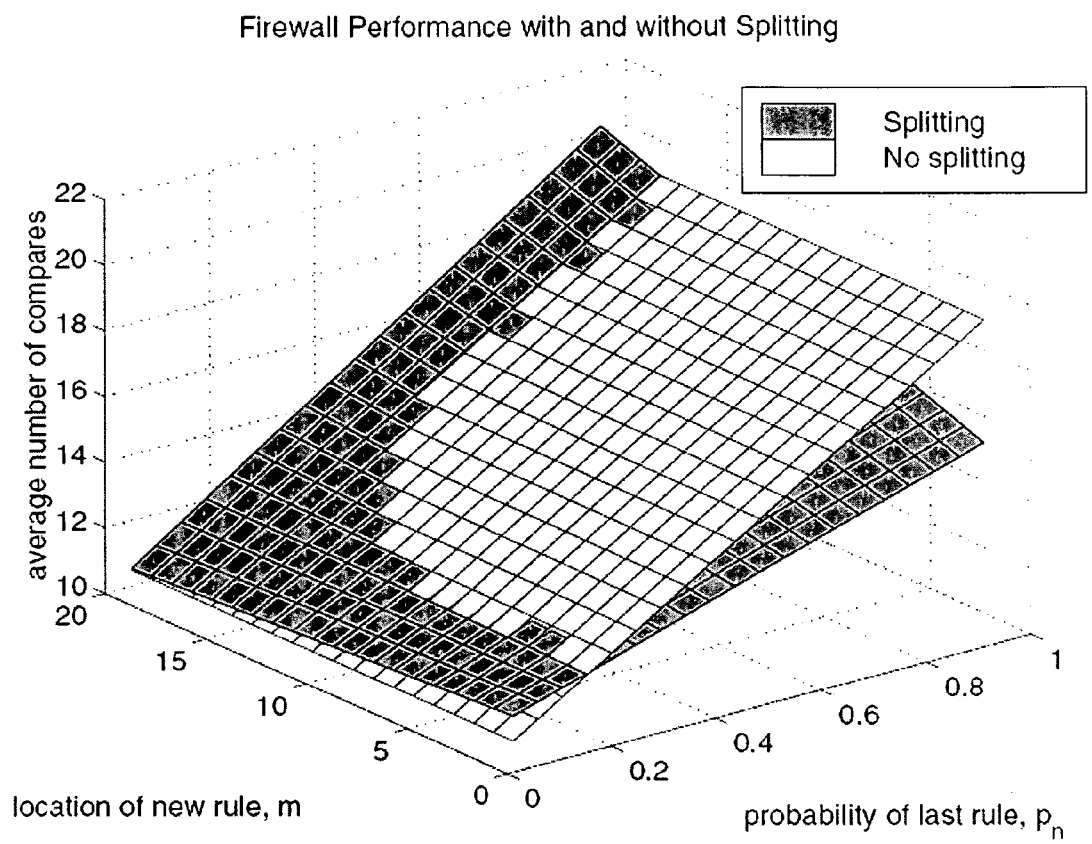
FIG. 8A is a graph illustrating firewall performance with and without rule splitting.
Figure 8B:
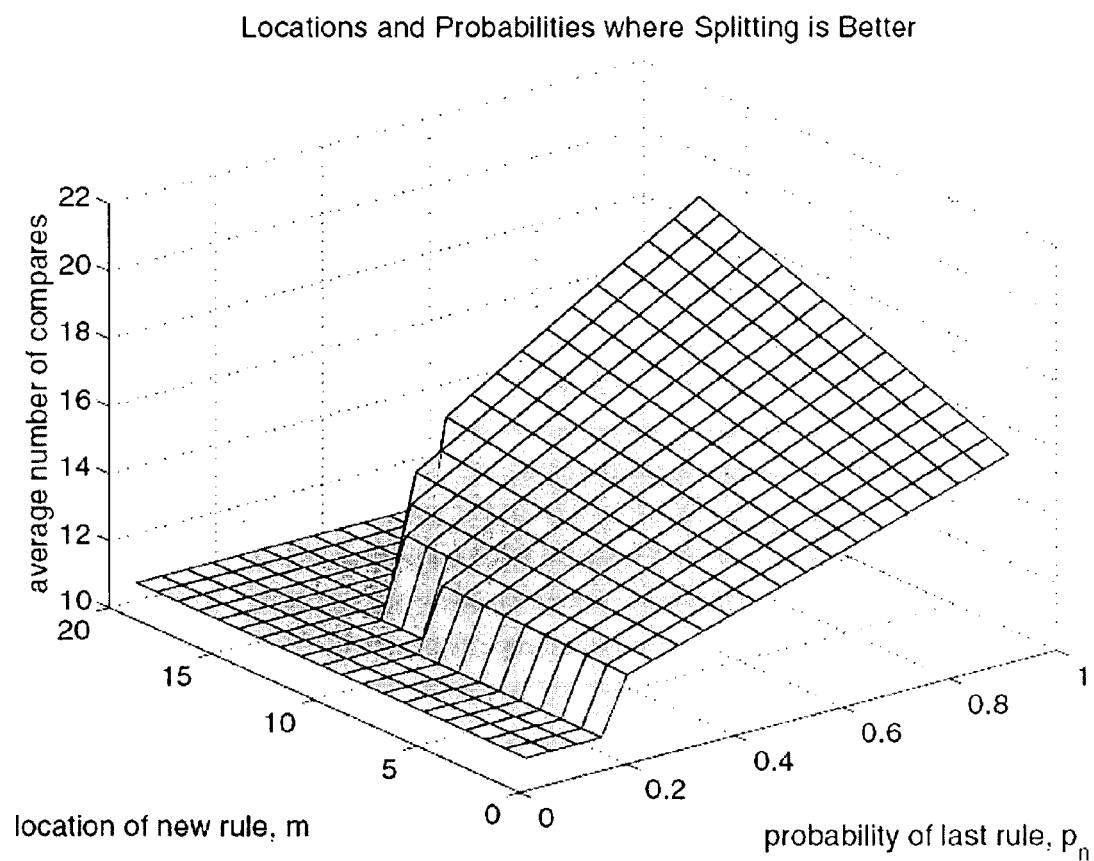
FIG. 8B is a graph illustrating locations and probabilities where splitting is better.

It many not be advantageous to split a general rule since it adds another rule to the policy. For example, assume a policy contains 20 rules where the first 19 rules have the same probability. Assume the last rule can be split and the new specific rule has a probability that is $$\frac{3}{4}$$

of the last rule. The impact of the probability of the last rule and the location of the new split rule, m, is depicted in FIGS. 8A and 8B. More particularly, FIG. 8A is a graph illustrating the average number of comparisons for firewalls with and without rule splitting. FIG. 8B is a graph illustrating average number of comparisons versus different locations of the new rule and probabilities. The average number of comparisons is reduced as the split rule is located closer to the first rule (surface decreases as m approaches one). Furthermore, splitting yields better results when the general rule has a high probability. However as illustrated in FIG. 8B, the closer the specific rule is to the location of the original rule the average number of comparisons increases, which is the penalty of adding one more rule to the policy.

The effect of splitting a single rule can be described mathematically as follows. Consider n rules where rule $r_n$ can be split into rules $r_{n,1}$ and $r_{n,r}$ (whose union is the original rule). In addition, assume the split rule $r_{n,1}$ will be located at the $m^{th}$ position ($1 \leq m < n$), while rule $r_{n,r}$ will remain at the $n^{th}$ location. The goal is to determine the best location m, which yields a lower average number of comparisons as compared to the original rule set. This can be defined mathematically in the following formula.

$$\sum_{i=1}^{n} i \cdot p_i > \sum_{i=1}^{m-1} i \cdot p_i + m \cdot p_{n,i} + \sum_{i=m}^{n-1} (i+1) \cdot p_i + (n+1) \cdot p_{n,r}$$

The left side of the inequality is the average number of comparisons for the original rule set. The right hand side of the inequality is the average number of comparisons with the specific rule at location m. If it is assumed that the rules located between m and n have an equal probability (denoted as p) the previous equation can be solved for m.

$$m < \frac{n \cdot p - n \cdot p_n + (n+1) \cdot p_{n,r}}{p - p_{n,t}}$$

The new rule must be located between the first and $m^{th}$; however, its final location will depend on the relationship with the other rules (cannot be placed before any rule for which it is a superset). This result can be applied iteratively to multiple rules and repeatedly to the same rule.

Rule Optimization for QoS

In the preceding sections, optimizing the entire security policy has been discussed. However, it may be desirable to optimize the rules for a certain type of traffic, in order to reduce the average number of comparisons this traffic encounters. This can be done by organizing the policy trie via traffic classification, then optimizing the sub-tries. The result is an ordering where the rules for the most important traffic are tested first.

Network Firewall Optimization Using Rule Compression

Another method for network firewall optimization is referred to as rule compression. Given a security policy R, one objective in optimizing firewall performance is to reduce number of rules in the policy while maintaining the original integrity. A method for reducing the number of rules called rule compression, which combines and replaces two rules in the policy will now be described. Although compression does reduce the number of rules, it can only be done if the integrity of the original policy is maintained.

Consider two rules $r_i$ and $r_j$ in policy R, where $r_i$ appears before $r_j$. The two rules can be compressed if and only if the following conditions are true 1. The two rules intersect, $r_i \cap r_j \neq \emptyset$ (an edge between $r_i$ and $r_j$ exists in the policy DAG) (Tuples that are proper subsets and supersets are considered. Compression may still occur if the rules do not intersect or are adjacent in the set space, the resulting rule may contain ranges.)
2. The action of $r_i$ and $r_j$ is the same.
3. Rule $r_i$ is not dependent on any rule $r_k$ that is directly or indirectly dependent on $r_j$ (only one path from $r_i$ to $r_j$ exists in the policy DAG).

The result of compression is a new rule, $r_{i,j}$ whose tuples are the union of the corresponding tuples of rules $r_i$ and $r_j$. The new rule $r_{i,j}$ replaces both $r_i$ and $r_j$ in R; however, the location of $r_{i,j}$ in R may require the relocation of other rules. Let $D_j$ be the ordered set of rules that appear after $r_i$ that directly or indirectly depend upon $r_j$. The new rule is placed at the original location of $r_i$ in R and the rules $D_j$ are placed before $r_{i,j}$.

Figure 9A:
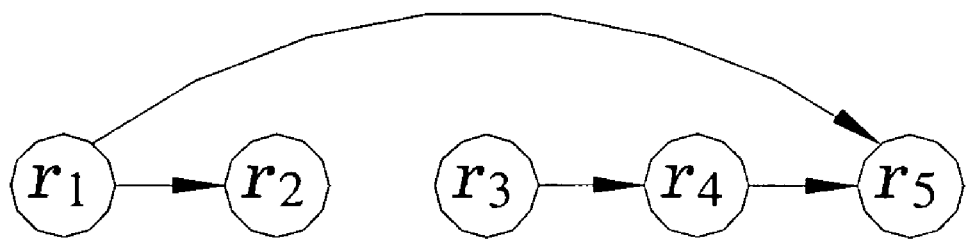
FIG. 9A is a policy DAG of a firewall rule set.
Figure 9B:
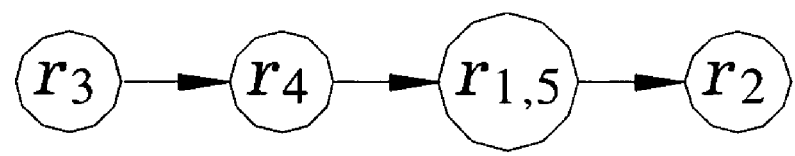
FIG. 9B is a policy DAG illustrating compression of rules $r_1$ and $r_5$.

For example, consider the policy given in Table 2. It is possible to compress rules $r_1$ and $r_5$, creating the new rule $r_{1,5}$=[TCP, *, *, 2.*, *, accept]. The ordered set $D_j$ in this example consists of the rules $r_3$ and $r_4$. As a result, the new rule $r_{1,5}$ is placed at the original location of $r_1$ while the rules in $D_j$ are placed before the new rule. FIGS. 9A and 9B respectively illustrate the original policy DAG for Table 2 and the policy DAG after rules $r_1$ and $r_5$ are compressed.

TABLE 2

Example Policy Consisting of Multiple Ordered Rules

| | | Source | | Destination | | |
|---|---|---|---|---|---|---|
| No. | Proto. | IP | Port | IP | Port | Action |
| 1 | TCP | 1.1.* | * | 2.2.* | * | accept |
| 2 | TCP | 1.* | * | * | 80 | deny |
| 3 | TCP | 3.3.* | * | * | 80 | accept |
| 4 | TCP | 3.* | * | * | * | deny |
| 5 | TCP | * | * | 2.* | 90 | accept |

Theorem Compressing rules $r_i$ and $r_j$ of policy R will maintain integrity if the three conditions are met and method described is used.

Proof Before $r_i$ and $r_j$ are compressed, relocate the rules $D_j$ immediately before $r_i$ and $D_i$. This relocation will maintain integrity due to the third requirement for compression (no rule in $D_i$ can be dependent on any rule in $D_j$). Now place $r_j$ directly after $r_i$. This relocation will not affect integrity since no rule in $D_i$ can have an edge to $r_j$ (again, due to the third condition). Compressing the neighboring rules $r_i$ and $r_j$ creates $r_{i,j}$. This does not affect integrity since the resulting rule only matches the packets that match $r_i$ or $r_j$ in the original policy. Therefore, the result is the compression of rule $r_i$ and $r_j$, and the integrity of the policy is maintained.

Determining if Compression Should Occur

Although compression may be possible, it may not improve the performance of the policy due to the relocation of rules. Compression should only occur if the average number of comparisons required for the new policy $R_c$ is less than the original policy R; therefore, $E[R_c] < E[R]$.

Firewall Rule Sub-Trie and Sub-List Ordering

Policy Sub-Trie Ordering

Figure 10A:
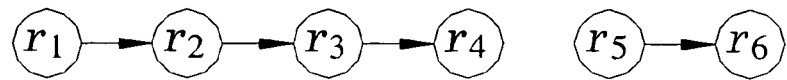
FIG. 10A is a policy DAG of a firewall rule list.
Figure 10B:
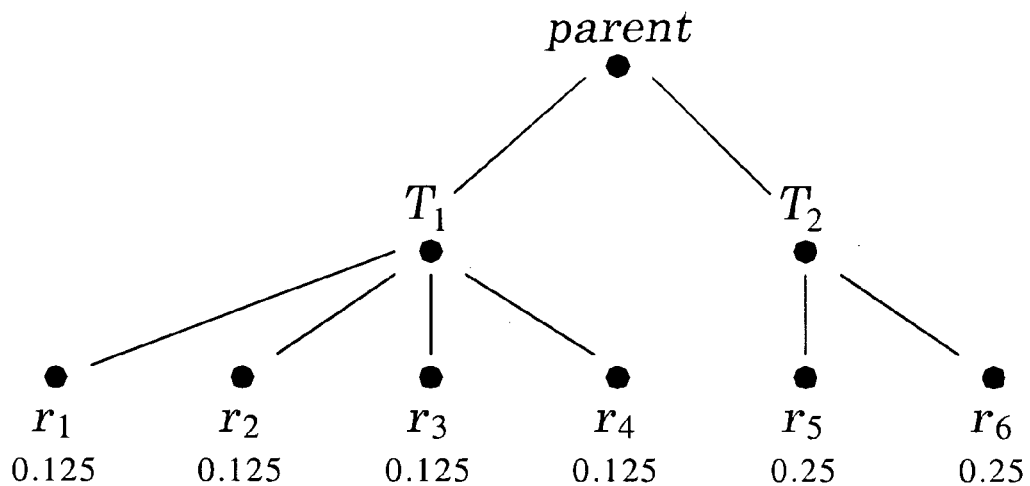
FIG. 10B is an original policy trie before sorting.
Figure 10C:
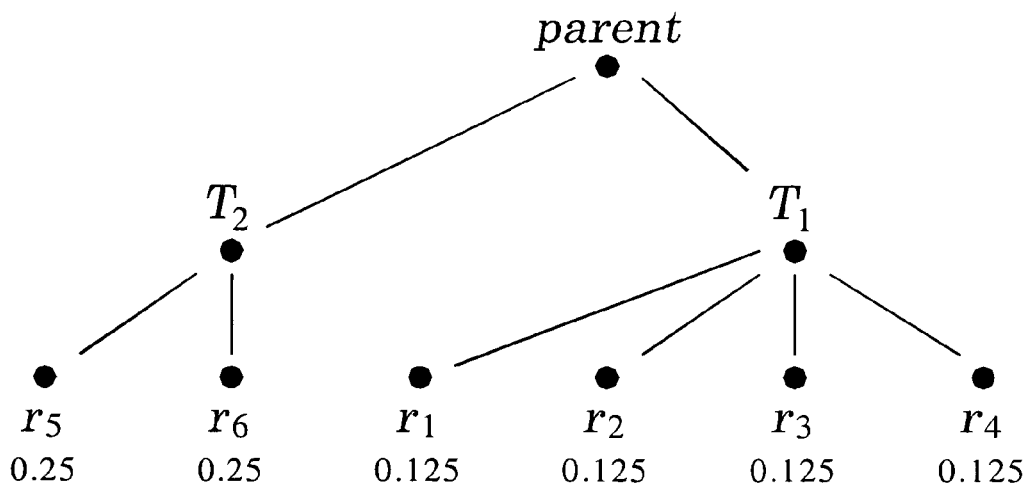
FIG. 10C is a policy trie illustrating the firewall rules after rotating sub-tries $T_1$ and $T_2$.

Additional methods for firewall optimization are referred to as firewall sub-trie and sub-list ordering. Given a policy trie T, it may be desirable to order all sub-tries such that the average number of tuple comparisons is reduced and policy integrity is maintained. Consider a policy trie T that contains sub-tries $T_i$ and $T_j$ having the same parent node, as seen in FIGS. 10A-10C. Let $P_i$ denote the sum of the probabilities of the rules contained in sub-trie i, while $C_i$ denotes the number of comparisons required to completely traverse sub-trie i (which is equal to the number of branches). In order to reduce the average number of tuple comparisons, sub-tries that share the same parent node should be ordered such that the following two conditions are observed.

1. Sub-tries that share a parent node are ordered such that the $P_i$ values are non-ascending (higher match probabilities occur first, from left to right).
2. If sub-tries that share a parent node have the same probability ($P_i$ equals $P_j$), then order the sub-tries such that the $C_i$ values are non-descending (sub-tries consisting of fewer comparisons occur first, from left to right).

These conditions are recursively applied throughout the policy trie as seen in FIGS. 11A-11D. However, these conditions do not necessarily maintain policy integrity.

Consider a group of n sub-tries that share the same parent node that are numbered sequentially from left to right. Consider any two non-intersecting sub-tries $T_i$ and $T_{i+k}$ in this group that are out of order. If two sub-tries do not intersect, denoted as $T_i \cap T_j$, then no rule in one sub-trie will intersect with any rule in the other sub-trie, $r_k \cap r_l, \forall r_k \in T_i, \forall r_l \in T_j$. The following integrity condition must be observed when reordering the sub-tries. The two sub-tries can be exchanged (rotated about the parent) if and only the sub-tries $T_i$ through $T_{i+k-1}$ do not intersect with $T_{i+k}$ and the sub-tries $T_{i+1}$ through $T_{i+k}$ do not intersect with $T_i$. Similar to finding the linear sequence of a policy DAGs, these conditions maintain the policy trie integrity. This is observed in FIG. 10A, where no edge exists between any rule in $T_1$ and $T_2$. More particularly, FIG. 10A is a policy DAG of a six-rule firewall list. FIG. 10B is a policy trie representation of the firewall rule list represented by FIG. 10A. In FIG. 10B, the average number of tuple compares required per packet is 5.5. FIG. 10C illustrates the policy trie after rotating sub-tries $T_1$ and $T_2$. In FIG. 10C, the average number of tuple compares required is 4.5. In FIGS. 10A-10C, the following probabilities are assumed:

$P_1=0.5$
$C_1=4$
$P_2=0.5$; and
$C_2=2$.

The average number of tuple comparisons is an estimate based on the longest trie path.

Using the conditions for comparing and ordering, the following sorting algorithm sorts neighboring sub-tries that share the same parent node.

--- m = a parent node in T
done = false
while(!done)
   done = true
   for each sub-trie $T_i$ having parent m AND a right neighboring sub-trie
      if((P$_i$ < P$_{i+1}$ AND (Pi == Pi+1 AND Ci > Ci+1)) AND $T_i$ ⌒ $T_{i+1}$) then
         interchange $T_i$ and $T_{i+1}$
         done = false
      endif
   endfor
endwhile

---

Figure 11A:
FIG. 11A is a policy DAG illustrating a firewall policy.
Figure 11B:
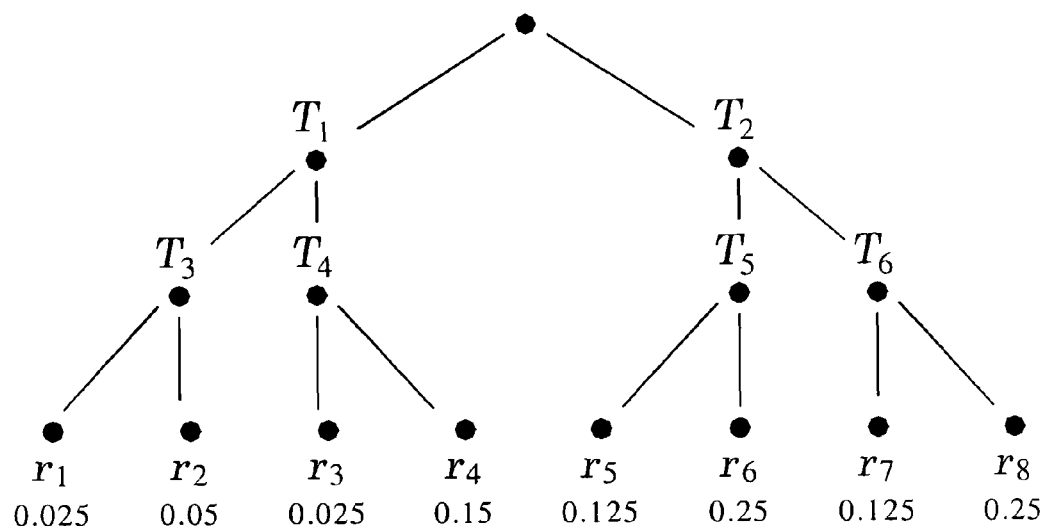
FIG. 11B is a policy trie illustrating firewall rules of the policy before sorting.
Figure 11C:
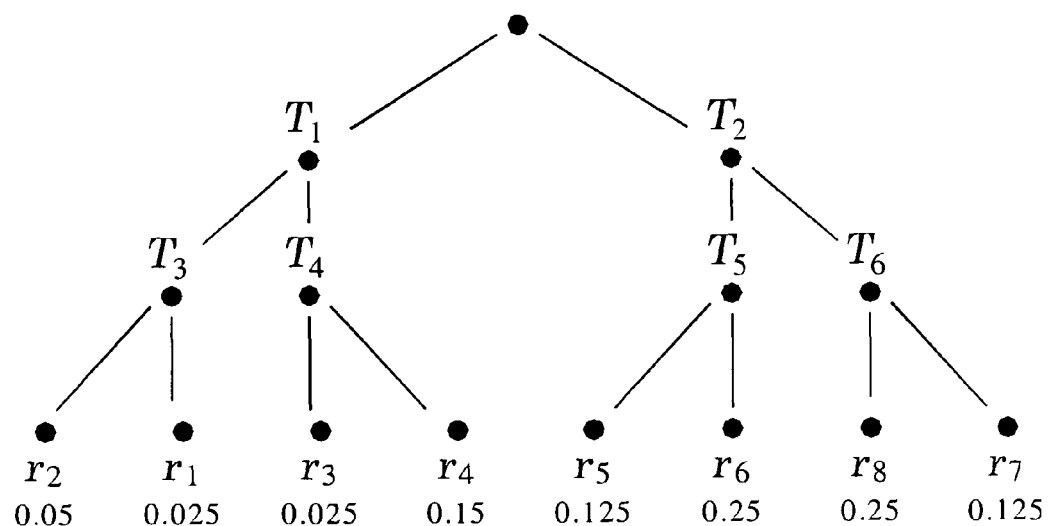
FIG. 11C is a policy trie illustrating the firewall policy after exchanging nodes $r_1$ and $r_2$ and nodes $r_7$ and $r_8$.
Figure 11D:
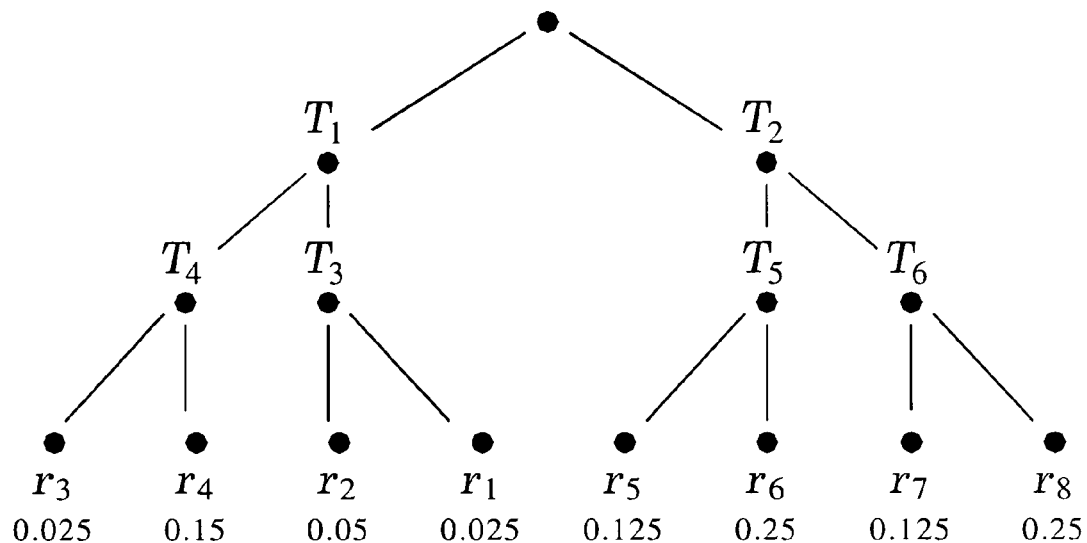
FIG. 11D is a policy trie illustrating the firewall policy after exchanging sub-tries $T_3$ and $T_4$.
Figure 11E:
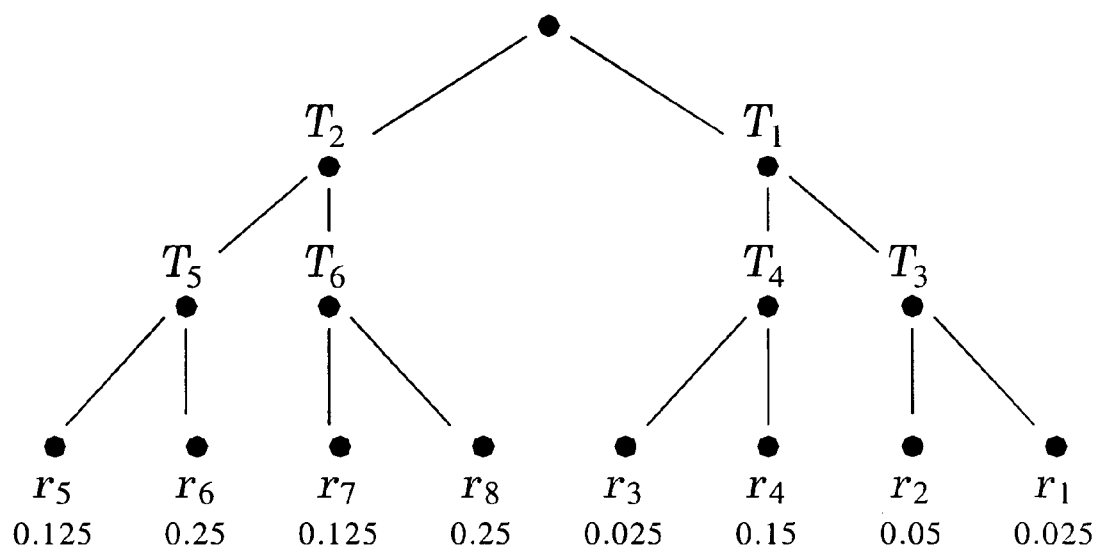
FIG. 11E is a policy trie illustrating the firewall policy after exchanging sub-tries $T_1$ and $T_2$.

FIGS. 11A-11D illustrate policy trie rotation for an eight-rule firewall policy. More particularly, FIG. 11A illustrates the policy DAG representation of an eight-rule firewall policy. FIG. 11B is a policy trie representation of the original firewall policy. In this example, ordering occurs in three stages, starting at the bottom level and moving towards the top level of the trie. In FIG. 11C, the leaves are ordered at the lowest level. More particularly, nodes $r_1$ and $r_2$ are exchanged with nodes $r_7$ and $r_8$. The average number of tuple compares for the ordering represented by FIG. 11C is 10.45. In FIG. 11D, the sub-tries on the second lowest level ($T_3$, $T_4$, $T_5$, and $T_6$) are ordered. More particularly, FIG. 11D illustrates the policy trie after exchanging sub-tries $T_3$ and $T_4$. The average number of tuple compares for the representation in FIG. 11D is 10.275. In FIG. 11E, the sub-tries on the second highest level, ($T_1$ and $T_2$) are ordered. FIG. 11E illustrates the final ordering after exchanging $T_1$ and $T_2$. In the policy trie of FIG. 11E, the average number of tuple compares required is 6.775. The average number of tuple comparisons is an estimate based on the longest trie path.

Policy Sub-List Ordering

The preceding section describes conditions for sorting policy sub-tries, which allow the exchange of groups of rules (sub-tries). The same conditions can be applied to list based policies, where sub-lists are ordered to improve the average number of rule comparisons.

Figure 12A:
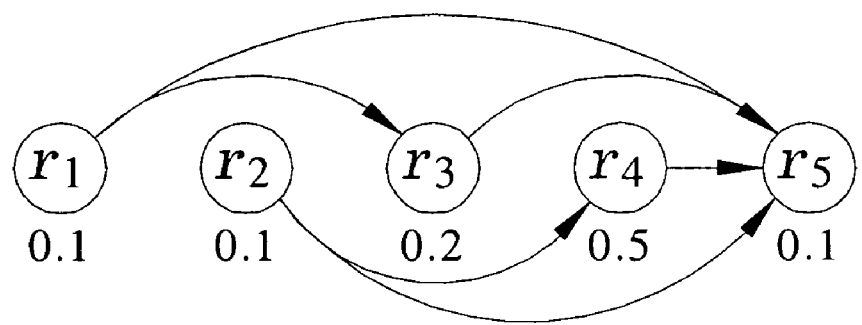
FIG. 12A is a policy DAG illustrating an original order for a firewall policy.
Figure 12B:
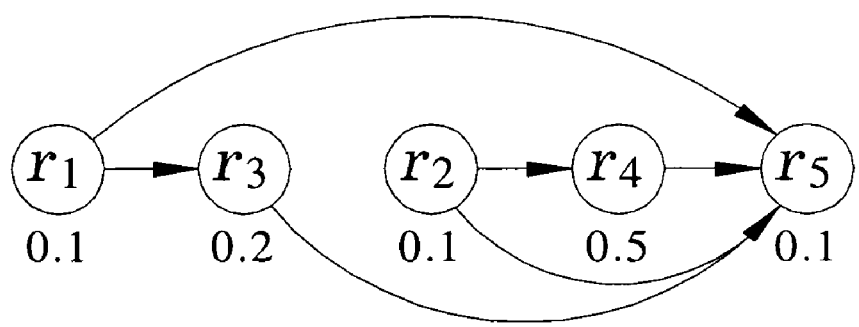
FIG. 12B is a policy DAG illustrating a sorted version of the firewall policy of FIG. 12A after exchanging neighbors.

In the sections above relating to rule sorting, a method is described to exchange neighboring rules in a list-based security policy, as seen in FIG. 12B. However, it was observed that when ordering rules in this fashion it is possible that one rule can block the exchange of another. If groups of rules were allowed to be exchanged the average number of rule comparisons could be further reduced.

Given a policy list L, it may be desirable to order all sub-lists such that the average number of rule comparisons is reduced and policy integrity is maintained. Consider a policy list L that contains sub-tries $L_i$ and $L_j$. Let $P_i$ denote the sum of the probabilities of the rules contained in sub-list i, while $C_i$ denotes the number of rules in sub-list i. In order to reduce the average number of rule comparisons, sub-lists should be ordered such that the following two conditions are observed.

1. Sub-lists are ordered such that the $P_i$ values are non-ascending (higher match probabilities occur first, from left to right).
2. If sub-lists have the same probability ($P_i$ equals $P_j$), then order the sub-lists such that the $C_i$ values are non-descending (sub-lists consisting of fewer comparisons occur first, from left to right).

These conditions are applied throughout the policy list; however as with policy tries, these conditions do not necessarily maintain policy integrity.

Figure 12C:
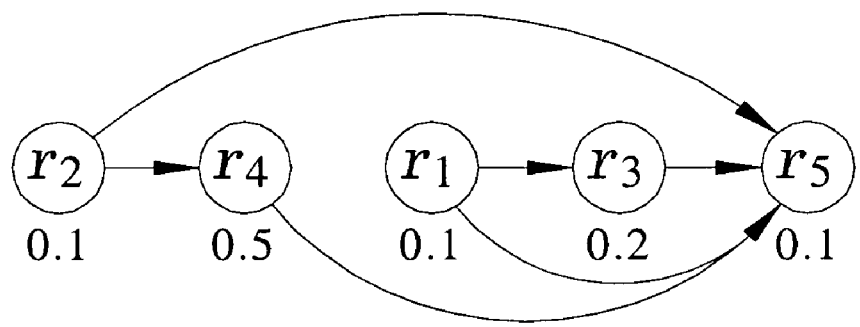
FIG. 12C is a policy DAG illustrating a sorted version of the firewall policy after exchanging lists $L_1$ including rules $r_1$ and $r_3$ and lists $L_2$ including rules $r_2$ and $r_4$.

Consider a group of n sub-lists that are numbered sequentially from left to right. Consider any two non-intersecting sub-lists $L_i$ and $L_{i+k}$ in this group that are out of order. If two sub-lists do not intersect, denoted as $L_i \cap L_j$, then no rule in one sub-list will intersect with any rule in the other sub-list, $r_k \cap r_l$, $\forall r_k \in L_i$, $\forall r_l \in L_j$. The following integrity condition must be observed when reordering the sub-lists. The two sub-lists can be exchanged if and only if the sub-lists $L_i$ through $L_{i+k-1}$ do not intersect with any rule in $L_{i+k}$ and sub-lists $L_{i+1}$ through $L_{i+k}$ do not intersect with $L_i$. Similar to finding the linear sequence of a policy DAGs, these conditions maintain the policy trie integrity. For example, consider the sub-lists $L_1=\{r_1, r_3\}$ and $L_2=\{r_2, r_4\}$ given in FIG. 12B. No edge exists between any rule in $L_1$ and $L_2$. The two sub-lists are out of order with respect to P and should be exchanged. The resulting list is given in FIG. 12C. FIG. 12A illustrates the original policy order and results in an average number of rule comparisons of 3.4. In the sorted version in FIG. 12B, the average number of rule comparisons is 3.3. In FIG. 12C, the average number of rule comparisons has been reduced to 2.7. Using the conditions for comparing and ordering, the following sorting algorithm sorts neighboring sub-lists.

--- done = false
while(!done)
   done = true
   for each sub-list $L_i$ having a right neighboring sub-list
      if ((P$_i$ < P$_{i+1}$ OR (P$_i$ == P$_{i+1}$ AND C$_i$ > C$_{i+1}$)) AND $L_i$ ⌒ $L_{i+1}$)then
         interchange rules and probabilities
         done = false
      endif
   endfor
endwhile

---

Summary of Firewall Policy Optimization Techniques and Methods

Figure 13:
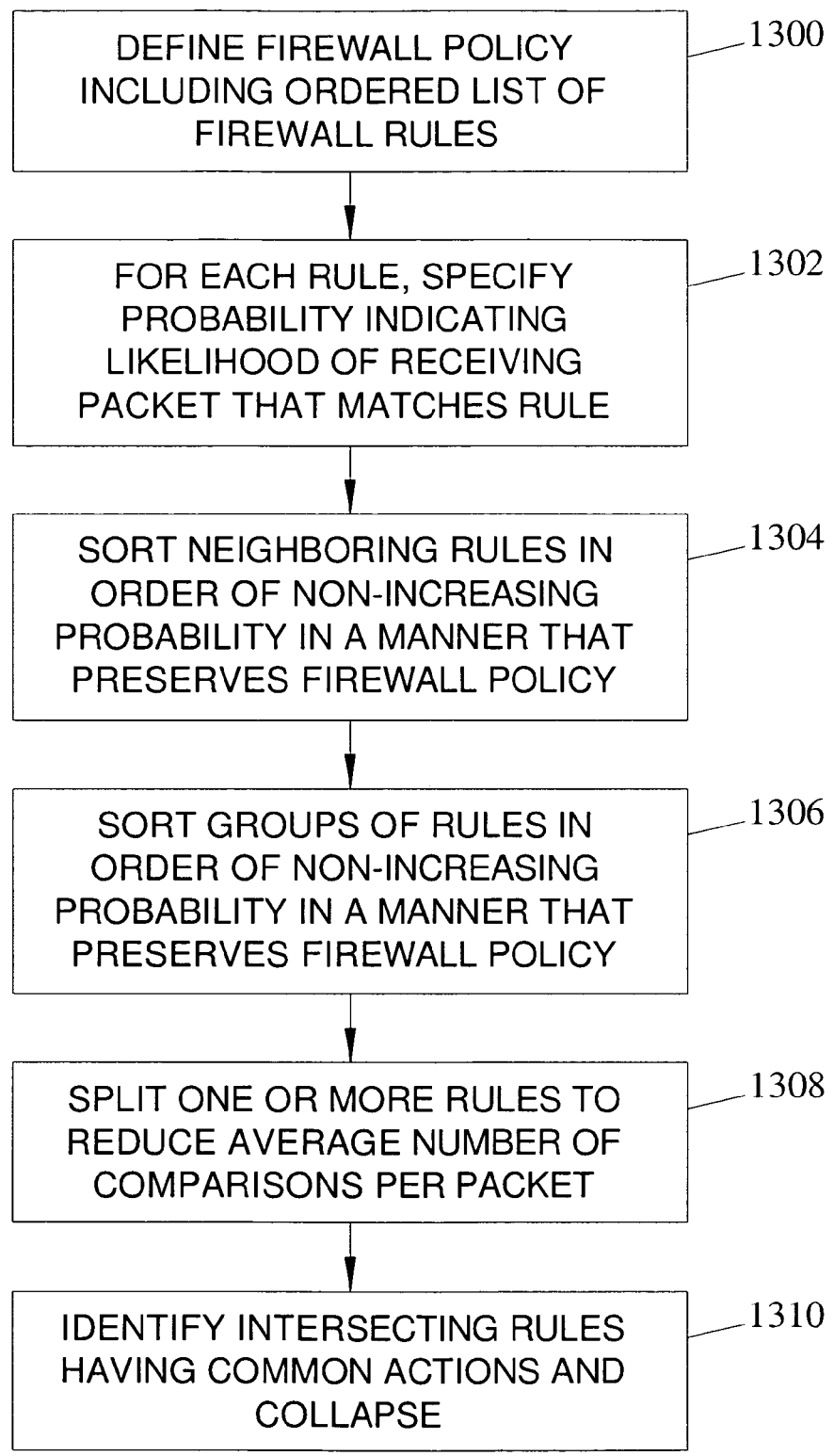
FIG. 13 is a flow chart illustrating exemplary steps for network firewall policy optimization according to an embodiment of the subject matter described herein.

As stated above, the methods and systems described herein for a network firewall policy optimization can be implemented using any combination of hardware, software, and/or firmware. Alternatively, the steps for firewall policy optimization can be performed manually with the number of rules being optimized is small enough. FIG. 13 is a flow chart illustrating an exemplary process for firewall policy optimization according to an embodiment of the subject matter described herein. Referring to FIG. 13, in block 1300, a firewall policy including an ordered list of firewall rules is defined. In block 1302, for each rule, a probability indicating a likelihood of receiving a packet that matches each rule is specified. In block 1304, neighboring rules are sorted in order of non-increasing probability in a manner that preserves firewall policy. In block 1306, groups of rules are sorted in order of non-increasing probability in a manner that preserves firewall policy. For example, any of the policy-trie-based methods described above may be used. In block 1308, one or more rules are split to reduce the number of average packet comparisons. In block 1310, intersecting rules having common actions are identified and collapsed into single rules.

Figure 14:
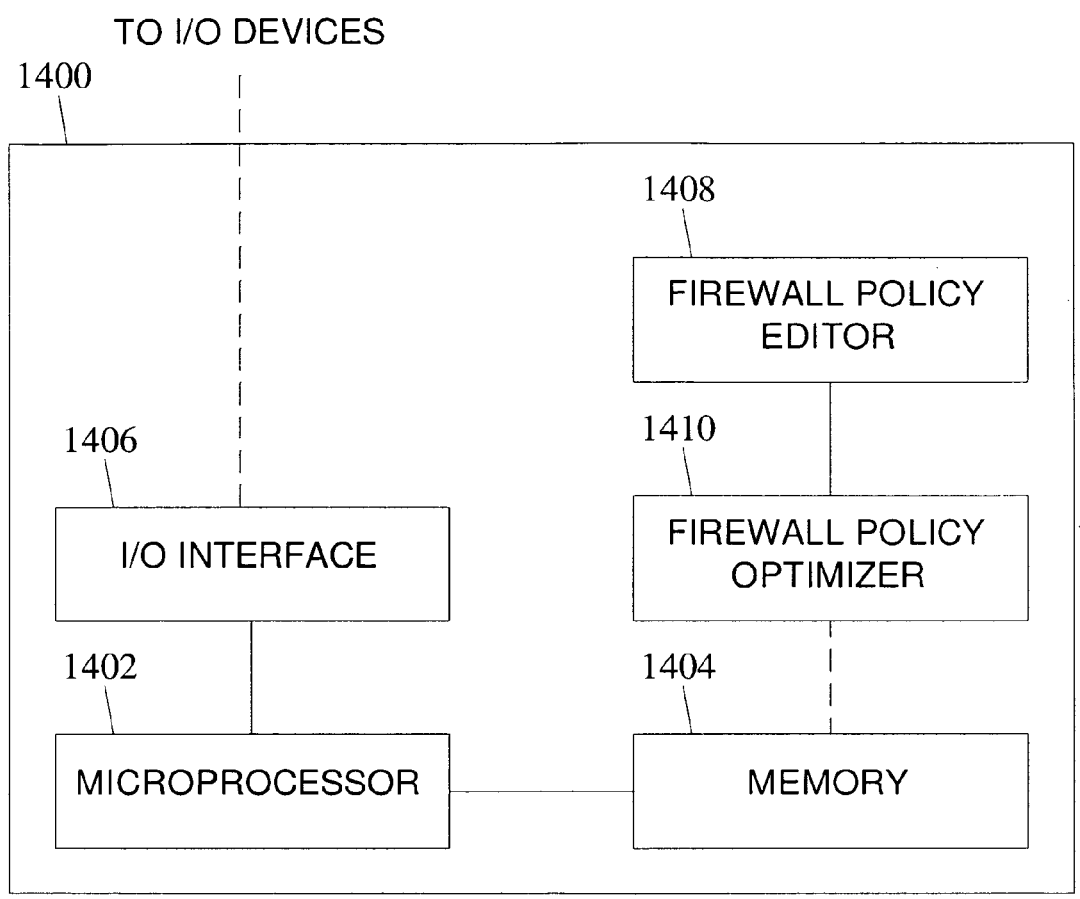
FIG. 14 is a block diagram illustrating exemplary components of a system for firewall policy optimization according to an embodiment of the subject matter described herein.

As described above, the subject matter described herein may be implemented in hardware, software, and/or firmware. In one implementation, the subject matter described herein for firewall policy optimization may be implemented on a general purpose computing platform. FIG. 14 is a block diagram of a general purpose computing platform including software for firewall policy optimization according to an embodiment of the subject matter described herein. Referring to FIG. 14, computing platform 1400 may be a general purpose computer, such as a personal computer, that includes a microprocessor 1402, memory 1404, and I/O interfaces 1406. Microprocessor 1400 may be any suitable microprocessor, such as any of the Intel or AMD families of microprocessors. Memory 1404 may include volatile memory for running programs and persistent memory, such as one or more disk storage devices. I/O interface 1406 may include interfaces with I/O devices, such as user input devices and output devices.

In the illustrated example, software that may be resident in memory 1404 includes a firewall policy editor 1408 and a firewall policy optimizer 1410. Firewall policy editor 1408 may allow a user to define a firewall policy. For example, firewall policy editor 1408 may allow a user to define a firewall policy by specifying different rules. The rules may be specified in a graphical manner, for example using policy DAGs as described above. Alternatively, firewall policy editor 1408 may allow a user to input rules in a tabular manner, as illustrated in any of the tables described herein. Firewall policy optimizer 1410 may implement any or all of the firewall policy optimization techniques to order rules entered via firewall policy editor 1408 in a manner that preserves policy integrity and that enhances firewall performance.

Figure 15:
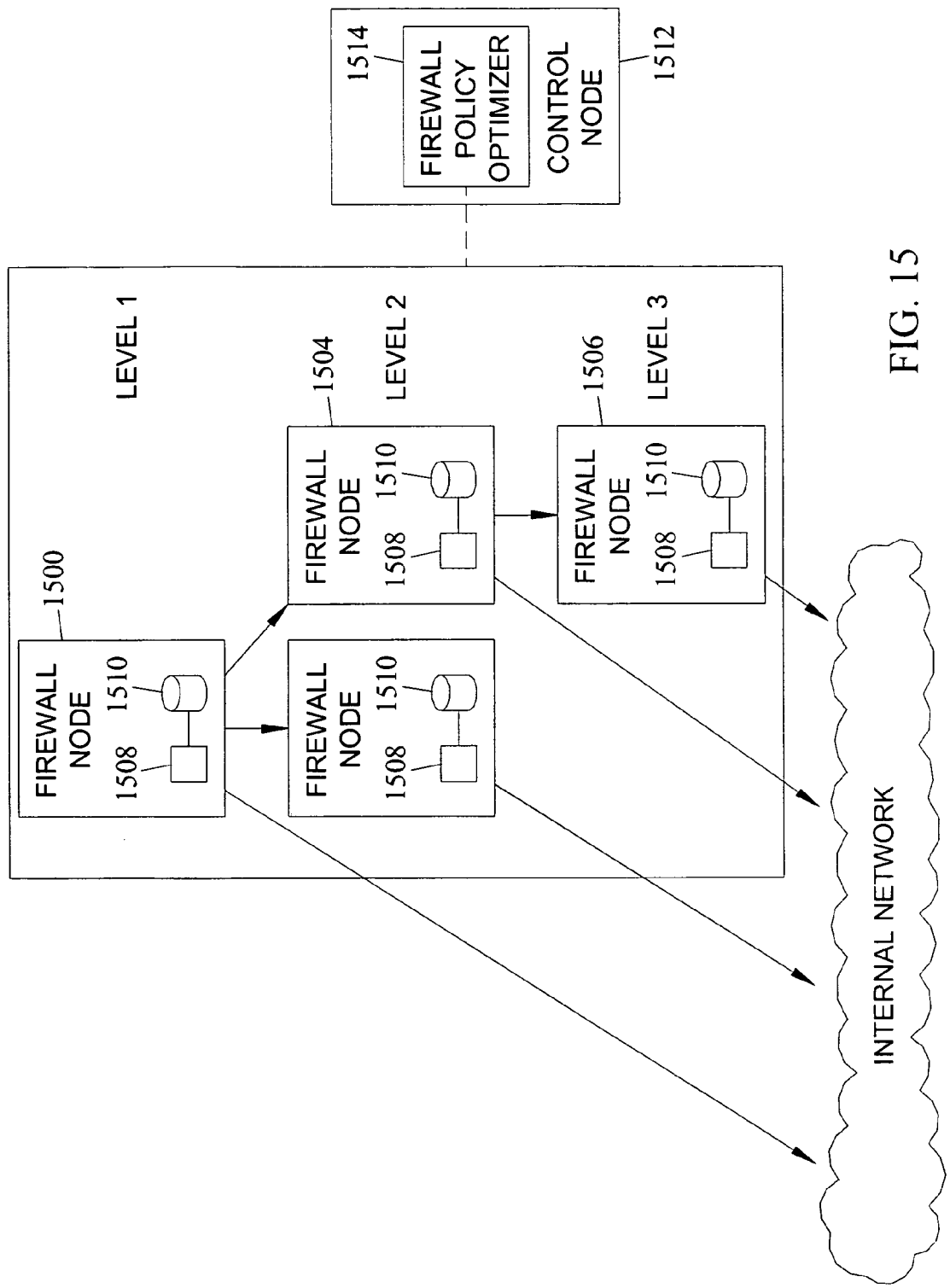
FIG. 15 is a block diagram illustrating a plurality of firewall nodes for implementing a firewall policy according to an embodiment of the subject matter described herein.

A firewall rule set that is optimized using the subject matter described herein may be implemented on any firewall system that includes one or more firewalls. For example, an optimized firewall rule set according to embodiments of the subject matter described herein may be implemented using any of the hierarchical, multi-node firewall systems described in commonly assigned, co-pending U.S. patent application Ser. No. 11/316,331, filed Dec. 22, 2005, the disclosure of which is incorporated herein by reference in its entirety. FIG. 15 illustrates an example of a multi-node firewall system suitable for implementing the firewall rules according to an embodiment of the subject matter described herein. Referring to FIG. 15, a plurality of firewall nodes 1500, 1502, 1504, and 1506 may collectively implement any of the optimized firewall policies described herein. For example, the firewall nodes may collectively implement different portions of a firewall policy data structure including an ordered list of firewall rules. A firewall policy engine 1508 resident on each firewall node may filter packets using its local portion 1510 of the firewall policy data structure. A control node 1512 may include a firewall policy optimizer 1514 that measures the average number of comparisons per packets for the current rule configuration and may dynamically reorder the rules to reduce the average number of comparisons per packet. For example, firewall policy optimizer 1514 may utilize any of the methods described herein to rearrange rules and improve firewall performance. Rules may be tested for rearrangement at user-specified intervals or when average number of packet comparisons increases by a user-specified amount.

Gateless Design

The gate plays an important role in the function-parallel design. It accepts information from the firewall nodes to determine the correct action to apply to a packet. Unfortunately, the gate is a special device that must coordinate with the individual firewall nodes in the system, which may be problematic to implement. However, it is possible to eliminate the gate and allow the firewall nodes to operate independently without any coordination. The significant advantage is that the gateless function-parallel design can be implemented with any firewall system (from open source to proprietary).

Figure 16A:
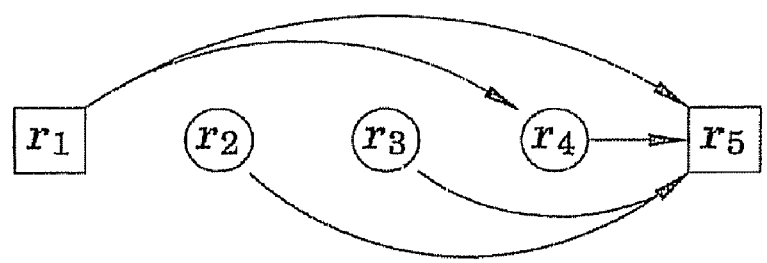
FIG. 16A illustrates a policy DAG where deny rules are indicated by a square node.
Figure 16B:
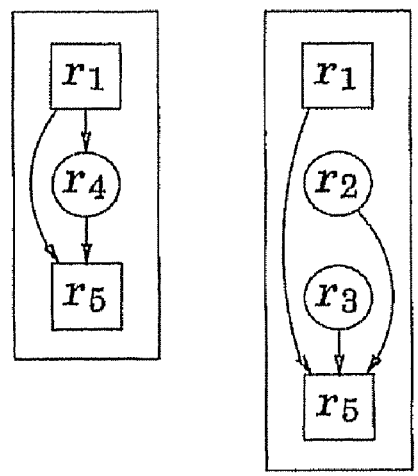
FIG. 16B is a block diagram illustrating initial gateless rule distribution among nodes in a function-parallel firewall according to an embodiment of the subject matter described herein.
Figure 16C:
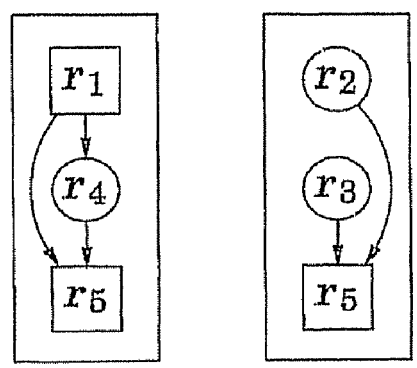
FIG. 16C is a block diagram illustrating final gateless rule distribution among nodes in a function-parallel firewall according to an embodiment of the subject matter described herein.

Eliminating the gate requires a rule distribution such that for any given packet, only one machine will ever accept and the remaining machines will always deny. Rule actions are either accept or deny. This can be seen in the policy DAG by denoting deny rules with a square and accept rules with a circle. To assure only one machine will accept a packet, an accept rule in a firewall node cannot intersect with another accept rule in any other firewall node. As described above, the intersection of two rules describes the set of packets that can match both rules. If an edge spans the local rules of firewall nodes, then the set of packets would be accepted by both firewall nodes; thus, duplicate packets would be accepted. In addition, every drop rule must be present in each firewall node to assure the remaining firewall nodes will drop the packet. Given these two requirements a policy DAG edge will not span firewall nodes, as illustrated in FIGS. 16B and 16C.

For example, consider a two-firewall node function-parallel system that implements the five-rule policy given in Table 3 set forth below. The policy DAG is given in FIG. 16A, where the first and last rules are deny. An initial gateless rule distribution is given in FIG. 16B which has no edges spanning the firewall nodes. Given the local policy DAG, deny rules can be removed if: no inbound edges exist for the deny rule; and all out-going edges for the deny rule connect to a superset deny rule. Using these constraints, the first rule in the second firewall node depicted in FIG. 16B can be removed (it is a subset of $r_5$ and has no other edges). This gives the final gateless rule distribution shown in FIG. 16C. As a result, the first firewall node in this distribution will only process UDP traffic, while the second machine only processes TCP. The rules can be divided with respect to other tuples, and can be done to provide QoS guarantees.

TABLE 3

Example Security Policy Consisting of Multiple Ordered Rules

| No. | Proto. | Source | | Destination | | Action | Prob. |
| --- | --- | --- | --- | --- | --- | --- | --- |
| | | IP | Port | IP | Port | | |
| 1 | UDP | 1.1.* | * | * | 80 | deny | 0.01 |
| 2 | TCP | 1.* | * | 1.* | 90 | accept | 0.02 |
| 3 | TCP | 2.* | * | 2.* | 20 | accept | 0.25 |
| 4 | UDP | 1.* | * | * | * | accept | 0.22 |
| 5 | * | * | * | * | * | deny | 0.50 |

REFERENCES

The disclosure of each of the following references is hereby incorporated herein by reference in its entirety.

[1] E. Al-Shaer and H. Hamed. Firewall Policy Management Advisor for Anomaly Detection and Rule Editing. In *Pro-* ceedings of the IFIP/IEEE International Symposium on Integrated Network Management, 2003.
[2] E. Al-Shaer and H. Hamed. Modeling and Management of Firewall Policies. *IEEE Transactions on Network and Service Management*, 1(1), 2004.
[3] S. M. Bellovin and W. Cheswick. Network Firewalls. *IEEE Communications Magazine*, pages 50-57, September 1994.
[4] C. Benecke. A Parallel Packet Screen for High Speed Networks. In *Proceedings of the 15th Annual Computer Security Applications Conference*, 1999.
[5] G. Brightwell and P. Winkler. Counting Linear Extensions is #P-Complete. In *Proceedings of the Twenty-Third Annual ACM Symposium on Theory of Computing*, 1991.
[6] M. Christiansen and E. Fleury. Using Interval Decision Diagrams for Packet Filtering. Technical report, BRICS, 2002.
[7] D. Decasper, Z. Dittia, G. Parulkar, and B. Plattner. Router Plugins: A Software Architecture for Next-Generation Routers. *IEEE/ACM Transactions on Networking*, 8(1), February 2000.
[8] M. Degermark, A. Brodnik, S. Carlsson, and S. Pink. Small Forwarding Tables for Fast Routing Lookups. In *Proceedings of ACM SIGCOMM*, pages 4-13, 1997.
[9] U. Ellermann and C. Benecke. Firewalls for ATM Networks. In Proceedings of *INFOSEC'COM*, 1998.
[10] A. Feldmann and S. Muthukrishnan. Tradeoffs for Packet Classification. In Proceedings of the *IEEE INFOCOM*, pages 397-413, 2000.
[11] E. W. Fulp. Firewall Architectures for High Speed Networks. Technical Report 20026, Wake Forest University Computer Science Department, 2002.
[12] E. W. Fulp. Firewall Policy Models Using Ordered-Sets. Technical report, Wake Forest University Computer Science Department, 2004.
[13] R. Funke, A. Grote, and H.-U. Heiss. Performance Evaluation of Firewalls in Gigabit-Networks. In *Proceedings of the Symposium on Performance Evaluation of Computer and Telecommunication Systems*, 1999.
[14] S. Goddard, R. Kieckhafer, and Y. Zhang. An Unavailability Analysis of Firewall Sandwich Configurations. In *Proceedings of the 6th IEEE Symposium on High Assurance Systems Engineering*, 2001.
[15] R. L. Graham, E. L. Lawler, J. K. Lenstra, and A. H. G. R. Kan. Optimizing and Approximation in Deterministic Sequencing and Scheduling: A Survey. *Annals of Discrete Mathematics*, 5:287-326, 1979.
[16] A. Hari, S. Suri, and G. Parulkar. Detecting and Resolving Packet Filter Conflicts. In *Proceedings of IEEE INFOCOM*, pages 1203-1212, 2000.
[17] HiPAC. High Performance Packet Classification. http://www.hipac.org.
[18] E. Horowitz, S. Sahni, and D. Mehta. *Fundamentals of Data Structures in C++*. Computer Science Press, 1995.
[19] E. L. Lawler. Sequencing Jobs to Minimize Total Weighted Completion Time Subject to Precedence Constraints. *Annals of Discrete Mathematics*, 2:75-90, 1978.
[20] W. E. Leland, M. S. Taqqu, W. Willinger, and D. V. Wilson. On the Self-Similar Nature of Ethernet Traffic. *IEEE Transactions on Networking*, 2:1-15, 1994.
[21] J. K. Lenstra and A. H. G. R. Kan. Complexity of Scheduling under Precedence Constraints. *Operations Research*, 26(1):22-35, 1978.
[22] O. Paul and M. Laurent. A Full Bandwidth ATM Firewall. In Proceedings of the 6th European Symposium on Research in Computer Security ESORICS'2000, 2000.
[23] B. R. Preiss. *Data Structures and Algorithms with Object-Oriented Design Patterns in C++*. John Wiley & Sons, 1999.
[24] L. Qui, G. Varghese, and S. Suri. Fast Firewall Implementations for Software and Hardware-Based Routers. In *Proceedings of ACM SIGMETRICS*, June 2001.
[25] V. P. Ranganath and D. Andresen. A Set-Based Approach to Packet Classification. In *Proceedings of the IASTED International Conference on Parallel and Distributed Computing and Systems*, pages 889-894, 2003.
[26] R. Rivest. On Self-Organizing Sequential Search Heuristics. *Communications of the ACM*, 19(2), 1976.
[27] W. E. Smith. Various Optimizers for Single-Stage Production. *Naval Research Logistics Quarterly*, 3:59-66, 1956.
[28] V. Srinivasan, G. Varghese, S. Suri, and M. Waldvogel. Fast and Scalable Layer Four Switching. In *Proceedings of ACM SIGCOMM*, pages 191-202, 1998.
[29] S. Suri and G. Varghese. Packet Filtering in High Speed Networks. In *Proceedings of the Symposium on Discrete Algorithms*, pages 969-970, 1999.
[30] R. L. Ziegler. *Linux Firewalls*. New Riders, second edition, 2002.
[31] E. D. Zwicky, S. Cooper, and D. B. Chapman. *Building Internet Firewalls*. O'Reilly, 2000.

It will be understood that various details of the invention may be changed without departing from the scope of the invention. Furthermore, the foregoing description is for the purpose of illustration only, and not for the purpose of limitation.

What is claimed is:

1. A method for producing a performance optimized firewall policy and for filtering network packets using the policy, the method comprising:
    defining a firewall policy including an ordered list of firewall rules;
    for each rule, defining a first match probability indicating the likelihood that the rule will be the first match for a given packet;
    sorting neighboring rules in the ordered list in order of non-increasing probability for the first match probabilities and in a manner that preserves the firewall policy; and
    storing the sorted rules in memory of at least one firewall node, filtering, using a processor of the at least one firewall node, packets in a network using the sorted rules, and performing one of: intrusion detection, intrusion protection, and packet blocking based on results of the filtering, wherein filtering the packets using the sorted rules includes applying the rules to each packet in an order defined by the sorted list until a match is found, which results in a lower average number of comparisons per packet than filtering packets using the unsorted list.

2. The method of claim 1 wherein sorting neighboring rules in order of non-increasing probability in a manner that preserves the firewall policy includes, for each pair of neighboring rules, rearranging the rules if a first rule of the pair has a lower probability than a second rule of the pair and the first rule of the pair is not a subset of the second rule of the pair with a different action.

3. The method of claim 1 comprising sorting groups of two or more rules in order of non-increasing probability in a manner that preserves the firewall policy.

4. The method of claim 3 wherein sorting groups of two or more rules in a manner that preserves firewall policy includes assigning each group of rules to a sub-trie in a policy trie, computing a sum of packet matching probabilities for rules in each sub-trie, and, in response to determining that a first sub-trie has a lower sum than a second sub-trie, rotating the first and second sub-tries about a common parent so that rules in the second sub-trie will be applied before the rules in the first sub-trie in the firewall policy.

5. The method of claim 4 comprising, in response to determining that the first and second sub-tries have equal sums, determining whether the second sub-trie has an lower number of branches than the first sub-trie, and, in response to determining that the second sub-trie has a lower number of branches than the first sub-trie, rotating the first and second sub-tries about a common parent so that the rules in the second sub-trie will be applied before the rules in the first sub-trie in the firewall policy.

6. A method for producing a performance optimized firewall policy and for filtering network packets using the policy, the method comprising:
    defining a firewall policy including an ordered list of firewall rules;
    for each rule, defining a probability indicating the likelihood of receiving a packet matching each rule;
    sorting neighboring rules in the ordered list in order of non-increasing probability for the probabilities defined in step (b) and in a manner that preserves the firewall policy; and
    storing the sorted rules in memory of at least one firewall node, filtering, using a processor of the at least one firewall node, packets in a network using the sorted rules, and performing one of: intrusion detection, intrusion protection, and packet blocking based on results of the filtering, comprising sorting groups of two or more rules in order of non-increasing probability in a manner that preserves the firewall policy, wherein sorting groups of two or more rules in a manner that preserves the firewall policy includes:
    identifying first and second sub-lists of rules in the ordered list of firewall rules, the first sub-list preceding the second sub-list in the ordered list of firewall rules;
    determining a sum of packet matching probabilities for each of the first and second sub-lists;
    determining whether the first and second sub-lists intersect; and
    in response to determining that the sum of the packet matching probabilities for the second sub-list is greater than the sum of the packet matching probabilities for the first sub-list and that the first and second sub-lists do not intersect, switching the order of the first and second sub-lists in the ordered list of firewall rules.

7. The method of claim 6 comprising, in response to determining that the sums of the packet matching probabilities for the first and sub-lists are equal, determining whether the second sub-list has a lower number of rules than the first sub-list, and, in response to determining that the second sub-list has a lower number of rules than the first sub-list, switching the order of the first and second sub-lists in the ordered list of firewall rules.

8. The method of claim 1 comprising splitting at least one of the firewall rules to reduce an average number of comparisons required per received packet.

9. The method of claim 1 comprising identifying intersecting rules having a common action and collapsing the rules into a single rule representing a union of the intersecting rules.

10. The method of claim 1 wherein sorting neighboring rules includes sorting rules such that comparisons for a particular class of packets are reduced.

11. The method of claim 1 comprising assigning the rules to vertices in a directed acyclical graph (DAG), determining precedence relationships between the rules, assigning the precedence relationships to edges that connect the vertices in the DAG, and wherein sorting the neighboring rules in order of non-increasing probability in a manner that preserves the firewall policy includes sorting the neighboring rules in a manner that preserves the precedence relationships represented by the DAG.

12. The method of claim 1 wherein the rules comprise intrusion detection rules.

13. The method of claim 1 wherein the rules comprise intrusion protection rules.

14. A system for firewall policy optimization, the system comprising:
    a firewall policy editor for allowing a user to define a firewall policy including an ordered list of firewall rules and for receiving input regarding a first match probability for each rule, wherein the first match probability indicates a likelihood that the rule will be the first match for a given packet; and
    a firewall policy optimizer for sorting neighboring rules in the ordered list in order of non-increasing probability for the probabilities received by the firewall policy editor and in a manner that preserves the firewall policy implemented by applying the rules in an order specified by the sorted list until a match is found, which results in a lower average number of comparisons per packet than filtering packets using the unsorted list.

15. The system of claim 14 wherein the firewall policy optimizer is adapted to, for each pair of neighboring rules, rearrange the rules if a first rule of the pair has a lower probability than a second rule of the pair and the first rule of the pair is not a subset of the second rule of the pair with a different action.

16. The system of claim 14 wherein the firewall policy optimizer is adapted to sort groups of two or more rules in order of non-increasing probability in a manner that preserves the firewall policy.

17. The system of claim 16 wherein the firewall policy optimizer is adapted to assign each group of rules to a sub-trie in a policy trie, to compute a sum of packet matching probabilities for rules in each sub-trie, and, in response to determining that a first sub-trie has a lower sum than a second sub-trie, to rotate the first and second sub-tries about a common parent so that rules in the second sub-trie will be applied before the rules in the first sub-trie in the firewall policy.

18. The system of claim 17 wherein the firewall policy optimizer is adapted to, in response to determining that the first and second sub-tries have equal sums, determine whether the second sub-trie has an lower number of branches than the first sub-trie, and, in response to determining that the second sub-trie has a lower number of branches than the first sub-trie, rotate the first and second sub-tries about a common parent so that the rules in the second sub-trie will be applied before the rules in the first sub-trie in the firewall policy.

19. A system for firewall policy optimization, the system comprising:
    a firewall policy editor for allowing a user to define a firewall policy including an ordered list of firewall rules and for receiving input regarding probabilities indicating the likelihood of receiving a packet matching each rule; and
    a firewall policy optimizer for sorting neighboring rules in the ordered list in order of non-increasing probability for the probabilities received by the firewall policy editor and in a manner that preserves the firewall policy, wherein the firewall policy optimizer is adapted to sort groups of two or more rules in order of non-increasing probability in a manner that preserves the firewall policy, and wherein the firewall policy optimizer is adapted to:
identify first and second sub-lists of rules in the ordered list of firewall rules, the first sub-list preceding the second sub-list in the ordered list of firewall rules;
determine a sum of packet matching probabilities for each of the first and second sub-lists;
determine whether the first and second sub-lists intersect; and
in response to determining that the sum of the packet matching probabilities for the second sub-list is greater than the sum of the packet matching probabilities for the first sub-list and that the first and second sub-lists do not intersect, switch the order of the first and second sub-lists in the ordered list of firewall rules.

20. The system of claim 19 wherein the firewall policy optimizer is adapted to, in response to determining that the sums of the packet matching probabilities for the first and sub-lists are equal, determine whether the second sub-list has a lower number of rules than the first sub-list, and, in response to determining that the second sub-list has a lower number of rules than the first sub-list, switch the order of the first and second sub-lists in the ordered list of firewall rules.

21. The system of claim 14 wherein the firewall policy optimizer is adapted to split at least one of the firewall rules to reduce an average number of comparisons required per received packet.

22. The system of claim 14 wherein the firewall policy optimizer is adapted to identify intersecting rules having a common action and collapse the rules into a single rule representing a union of the intersecting rules.

23. The system of claim 14 wherein the firewall policy optimizer is adapted to sort neighboring rules such that comparisons for a particular class of packets are reduced.

24. The system of claim 14 wherein the firewall policy optimizer is adapted to assign the rules to vertices in a directed acyclical graph (DAG), determine precedence relationships between the rules, assign the precedence relationships to edges that connect the vertices in the DAG, and to sort the neighboring rules in a manner that preserves the precedence relationships represented by the DAG.

25. The system of claim 14 wherein the rules comprise intrusion detection rules.

26. The system of claim 14 wherein the rules comprise intrusion protection rules.

27. A system for optimizing a firewall policy and for filtering packets using the optimized firewall policy, the system comprising:
at least one firewall node, the at least one firewall node including:
a firewall policy data structure located in memory of the at least one firewall node for storing an ordered list of firewall rules;
a firewall policy engine executed by a processor of the at least one firewall node for implementing a firewall policy by comparing packets to the rules in the order specified by the firewall policy data structure and for performing one of: intrusion detection, intrusion protection, and packet blocking based on results of the comparing; and
a firewall policy optimizer operatively associated with the at least one firewall node for optimizing performance of the network firewall by reordering the rules in the ordered list in a manner that reduces an average number of rule comparisons per packet based on a first match probability defined for each rule indicating the likelihood that the rule will be the first match for a given packet wherein the rules are re-ordered in a manner that preserves the firewall policy, and wherein the firewall policy engine applies the rules to each packet in the order specified by the re-ordered list until a match is found.

28. A system for optimizing a firewall policy and for filtering packets using the optimized firewall policy, the system comprising:
at least one firewall node, the at least one firewall node including:
a firewall policy data structure located in memory of the at least one firewall node for storing an ordered list of firewall rules;
a firewall policy engine executed by a processor of the at least one firewall node for implementing a firewall policy by comparing packets to the rules in the order specified by the firewall policy data structure and for performing one of: intrusion detection, intrusion protection, and packet blocking based on results of the comparing; and
a firewall policy optimizer operatively associated with the at least one firewall node for optimizing performance of the network firewall by reordering the rules in the ordered list in a manner that reduces an average number of rule comparisons per packet based on a probability defined for each rule indicating a likelihood of receiving a packet matching each rule and that preserves the firewall policy, and
wherein the firewall policy optimizer is adapted to measure average number of comparisons per packet for a rule ordering specified by the firewall policy data structure and to dynamically re-order to rules to reduce the average number of comparisons per packet.

29. A non-transitory machine-accessible and readable medium having stored thereon machine-executable instructions for controlling the machine to perform steps comprising:
defining a firewall policy including an ordered list of firewall rules;
for each rule, defining a first match probability indicating the likelihood that the rule will be the first match for given packet;
sorting neighboring rules in the ordered list in order of non-increasing probability based on the probabilities and in a manner that preserves the firewall policy, wherein filtering packets using the sorted rules results in a lower average number of comparisons per packet than filtering packets using the unsorted list; and
storing the sorted rules in memory of at least one firewall node, filtering, using a processor of the at least one firewall node, packets in a network using the sorted rules, and performing one of: intrusion detection, intrusion protection, and packet blocking based on results of the filtering, wherein filtering the packets using the sorted rules includes applying the rules to each packet in an order defined by the sorted list until a match is found, which results in a lower average number of comparisons per packet than filtering packets using the unsorted list.

30. The machine-accessible and readable medium of claim 29 wherein sorting neighboring rules in order of non-increasing probability in a manner that preserves the firewall policy includes, for each pair of neighboring rules, rearranging the rules if a first rule of the pair has a lower probability than a second rule of the pair and the first rule of the pair is not a subset of the second rule of the pair with a different action.

31. The machine-accessible and readable medium of claim 29 comprising sorting groups of two or more rules in order of non-increasing probability in a manner that preserves the firewall policy.

32. The machine-accessible and readable medium of claim 31 wherein sorting groups of two or more rules in a manner that preserves firewall policy includes assigning each group of rules to a sub-trie in a policy trie, computing a sum of packet matching probabilities for rules in each sub-trie, and, in response to determining that a first sub-trie has a lower sum than a second sub-trie, rotating the first and second sub-tries about a common parent so that rules in the second sub-trie will be applied before the rules in the first sub-trie in the firewall policy.

33. The machine-accessible and readable medium of claim 32 comprising, in response to determining that the first and second sub-tries have equal sums, determining whether the second sub-trie has an lower number of branches than the first sub-trie, and, in response to determining that the second sub-trie has a lower number of branches than the first sub-trie, rotating the first and second sub-tries about a common parent so that the rules in the second sub-trie will be applied before the rules in the first sub-trie in the firewall policy.

34. A computer program product comprising computer executable instructions embodied in a computer readable medium for performing steps comprising:
    defining a firewall policy including an ordered list of firewall rules;
    for each rule, defining a probability indicating the likelihood of receiving a packet matching each rule; and
    sorting neighboring rules in the ordered list in order of non-increasing probability based on the probabilities defined in step (b) and in a manner that preserves the firewall policy, comprising sorting groups of two or more rules in order of non-increasing probability in a manner that preserves the firewall policy, and wherein sorting groups of two or more rules in a manner that preserves the firewall policy includes:
    identifying first and second sub-lists of rules in the ordered list of firewall rules, the first sub-list preceding the second sub-list in the ordered list of firewall rules;
    determining a sum of packet matching probabilities for each of the first and second sub-lists;
    determining whether the first and second sub-lists intersect; and
    in response to determining that the sum of the packet matching probabilities for the second sub-list is greater than the sum of the packet matching probabilities for the first sub-list and that the first and second sub-lists do not intersect, switching the order of the first and second sub-lists in the ordered list of firewall rules.

35. The machine-accessible and readable medium of claim 34 comprising, in response to determining that the sums of the packet matching probabilities for the first and sub-lists are equal, determining whether the second sub-list has a lower number of rules than the first sub-list, and, in response to determining that the second sub-list has a lower number of rules than the first sub-list, switching the order of the first and second sub-lists in the ordered list of firewall rules.

36. The machine-accessible and readable medium of claim 29 comprising splitting at least one of the firewall rules to reduce an average number of comparisons required per received packet.

37. The machine-accessible and readable medium of claim 29 comprising identifying intersecting rules having a common action and collapsing the rules into a single rule representing a union of the intersecting rules.

38. The machine-accessible and readable medium of claim 29 wherein sorting neighboring rules includes sorting rules such that comparisons for a particular class of packets are reduced.

39. The machine-accessible and readable medium of claim 29 comprising assigning the rules to vertices in a directed acyclical graph (DAG), determining precedence relationships between the rules, assigning the precedence relationships to edges that connect the vertices in the DAG, and wherein sorting the neighboring rules in order of non-increasing probability in a manner that preserves the firewall policy includes sorting the neighboring rules in a manner that preserves the precedence relationships represented by the DAG.

40. The machine-accessible and readable medium of claim 29 wherein the rules comprise intrusion detection rules.

41. The machine-accessible and readable medium of claim 29 wherein the rules comprise intrusion protection rules.

42. A system for optimizing a firewall policy and for filtering packets using the optimized firewall policy, the system comprising:
    a first firewall node including a firewall policy data structure located in memory of the first firewall node for storing a first portion of an ordered list of firewall rules and a firewall policy engine executed by a processor of the first firewall node for implementing a firewall policy by comparing packets to the rules in an order specified by the firewall policy data structure and for performing one of: intrusion detection, intrusion protection, and packet blocking based on results of the comparing;
    a second firewall node including a firewall policy data structure located in memory of the second firewall node for storing a second portion of the ordered list of firewall rules and a firewall policy engine executed by a processor of the second firewall node for implementing the firewall policy by comparing packets to the rules in an order specified by the firewall policy data structure and for performing one of: intrusion detection, intrusion protection, and packet blocking based on results of the comparing; and
    a firewall policy optimizer operatively associated with the first and second firewall nodes for optimizing performance of the first and second firewall nodes by reordering the rules in the ordered list in a manner that reduces an average number of comparisons per packet and in a manner that preserves firewall policy, wherein the firewall policy engine in each of the firewall nodes applies the rules to each packet in an order specified by its respective portion of the reordered list until a match is found, wherein the first and second firewall nodes are configured to implement a gateless design, wherein the rules are distributed among the first and second firewall nodes such that for any given packet, only one of the first and second firewall nodes will accept the packet and the other of the first and second firewall nodes will always deny the packet and wherein each of the packets is replicated to each of the firewall nodes.

* * * * *